(12) United States Patent
Kusanose et al.

(10) Patent No.: US 10,703,892 B2
(45) Date of Patent: Jul. 7, 2020

(54) RESIN COMPOSITION AND MOLDED BODY

(71) Applicant: Asahi Kasei Kabushiki Kaisha, Tokyo (JP)

(72) Inventors: Yasuhiro Kusanose, Tokyo (JP); Hiroyuki Ichino, Tokyo (JP); Masashi Yamamoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 52 days.

(21) Appl. No.: 16/094,318

(22) PCT Filed: Apr. 24, 2017

(86) PCT No.: PCT/JP2017/016214
§ 371 (c)(1),
(2) Date: Oct. 17, 2018

(87) PCT Pub. No.: WO2017/188184
PCT Pub. Date: Nov. 2, 2017

(65) Prior Publication Data
US 2019/0119478 A1   Apr. 25, 2019

(30) Foreign Application Priority Data

Apr. 25, 2016   (JP) ................................ 2016-087345

(51) Int. Cl.
| | | |
|---|---|---|
| *C08L 23/12* | (2006.01) | |
| *C08L 53/02* | (2006.01) | |
| *C08L 23/10* | (2006.01) | |
| *C08F 8/04* | (2006.01) | |
| *C08L 23/14* | (2006.01) | |
| *C08F 210/08* | (2006.01) | |
| *C08F 212/08* | (2006.01) | |
| *C08L 53/00* | (2006.01) | |

(52) U.S. Cl.
CPC .............. *C08L 23/142* (2013.01); *C08F 8/04* (2013.01); *C08F 210/08* (2013.01); *C08F 212/08* (2013.01); *C08L 23/10* (2013.01); *C08L 23/12* (2013.01); *C08L 23/14* (2013.01); *C08L 53/005* (2013.01); *C08L 53/02* (2013.01); *C08L 53/025* (2013.01); *C08F 2500/03* (2013.01); *C08F 2500/17* (2013.01); *C08F 2800/20* (2013.01); *C08L 2205/025* (2013.01); *C08L 2205/03* (2013.01); *C08L 2207/10* (2013.01)

(58) Field of Classification Search
CPC ........ C08L 53/025; C08L 53/02; C08L 23/12; C08L 2205/03
See application file for complete search history.

(56) References Cited

U.S. PATENT DOCUMENTS

| | | | |
|---|---|---|---|
| 9,056,976 B2 | 6/2015 | Kuwahara et al. | |
| 2011/0015333 A1 | 1/2011 | Fujiwara et al. | |
| 2017/0029614 A1* | 2/2017 | Yagi ........................ | C08L 71/12 |
| 2017/0042766 A1 | 2/2017 | Nojima et al. | |
| 2017/0073510 A1 | 3/2017 | Ichino et al. | |

FOREIGN PATENT DOCUMENTS

| | | |
|---|---|---|
| JP | H10-067894 A | 3/1998 |
| JP | 2001-106844 A | 4/2001 |
| JP | 2010-106200 A | 5/2010 |
| JP | 2010-229348 A | 10/2010 |
| WO | 2009/119592 A1 | 10/2009 |
| WO | 2015/137355 A1 | 9/2015 |
| WO | 2016/039257 A1 | 3/2016 |

OTHER PUBLICATIONS

International Preliminary Report on Patentability issued in corresponding International Patent Application No. PCT/JP2017/016214 dated Oct. 30, 2018.
Supplemental European Search Report issued in corresponding European Patent Application No. 17789466.4 dated Apr. 1, 2019.
International Search Report issued in corresponding International Patent Application No. PCT/JP2017/016214 dated Jul. 18, 2017.

* cited by examiner

*Primary Examiner* — Jeffrey C Mullis
(74) *Attorney, Agent, or Firm* — Morgan, Lewis & Bockius LLP

(57) ABSTRACT

The resin composition according to the present invention contains a polypropylene resin (a), a hydrogenated block copolymer (b), and a hydrogenated block copolymer (c), wherein: a mass ratio of a content of the hydrogenated block copolymer (b) to a content of the hydrogenated block copolymer (c), (b)/(c), is 90/10 to 10/90; a mass ratio of a content of the polypropylene resin (a) to a total content of the hydrogenated block copolymer (b) and the hydrogenated block copolymer (c), (a)/((b)+(c)), is 10/90 to 90/10; and specific polymer blocks (C), (B1), and (B2) differing in amount of vinyl bond before hydrogenation are contained at a specific ratio.

15 Claims, No Drawings

RESIN COMPOSITION AND MOLDED BODY

TECHNICAL FIELD

The present invention relates to a resin composition and a molded body.

BACKGROUND ART

Polypropylene resin compositions are generally excellent in chemical resistance and mechanical properties and are therefore used in a wide range including packaging materials, machine parts, automobile parts, and the like. Because of environmental necessity, the development of non-halogenated transparent polymer materials has been underway recently. Particularly, in the fields of tubes, sheets, and films, polypropylene resins are used, and there has arisen a demand for, for example, softening the polypropylene resins or rendering the polypropylene resins transparent, according to applications.

In response to the demand, for example, Patent Literatures 1 to 2 propose a resin composition comprising a polypropylene resin and two specific hydrogenated block copolymers. The resin composition described in Patent Literature 1 is reportedly excellent in transparency, low temperature properties, and moldability, and the resin composition described in Patent Literature 2 is reportedly excellent in the balance among heat sealability, flexibility, transparency, impact resistance, and low stickiness.

CITATION LIST

Patent Literature

Patent Literature 1: Japanese Patent Laid-Open No. 2010-106200
Patent Literature 2: International Publication No. WO 2015/137355

SUMMARY OF INVENTION

Technical Problem

Molded bodies of polypropylene resin compositions for use in the packaging field for food, the packaging field for apparel, and the medical field including infusion tubes and infusion bags, etc. are required to have a good balance among properties such as flexibility, transparency, anisotropy, low stickiness, and impact resistance at low temperatures (hereinafter, also referred to as "low temperature impact resistance"). However, the hydrogenated diene polymer as described in Patent Literatures 1 and 2 and a polypropylene resin composition obtained using the same have room for improvement in the balance among properties such as low temperature impact resistance, flexibility, transparency, and low stickiness.

The present invention has been made in light of the problems of the conventional techniques described above. An object of the present invention is to provide a resin composition excellent in the balance among the flexibility, transparency, anisotropy, low stickiness, and low temperature impact resistance of a molded body thereof.

Solution to Problem

The present inventors have conducted diligent studies and experiments to solve the problems of the conventional techniques and consequently completed the present invention by finding that the problems can be solved by using specific amounts of a polypropylene resin and hydrogenated block copolymers (b) and (c) having a specific configuration.

The present invention is as follows:

[1]

A resin composition comprising a polypropylene resin (a), a hydrogenated block copolymer (b), and a hydrogenated block copolymer (c), wherein:

the hydrogenated block copolymer (b) is a hydrogenated block copolymer comprising, in its molecule, a polymer block (B1) having a conjugated diene compound as a main component, and a polymer block (S) having a vinyl aromatic compound as a main component;

the hydrogenated block copolymer (c) is a hydrogenated block copolymer comprising, in its molecule, a polymer block (B2) having a conjugated diene compound as a main component, and a polymer block (S) having a vinyl aromatic compound as a main component;

the hydrogenated block copolymer (b) and/or (c) is a hydrogenated block copolymer further comprising, in the molecule, a polymer block (C) having a conjugated diene compound as a main component;

in the hydrogenated block copolymer (b), a content of the polymer block (C) is 20 mass % or less, a content of the polymer block (B1) is 73 to 97 mass %, and a content of the polymer block (S) is 1 to 15 mass %;

in the hydrogenated block copolymer (c), a content of the polymer block (C) is 20 mass % or less, a content of the polymer block (B2) is 73 to 97 mass %, and a content of the polymer block (S) is 1 to 15 mass %;

a total amount of the polymer block (C) is 1 to 20 mass %, and a total amount of the polymer blocks (C) and (S) is 3 to 27 mass %, based on 100 mass % in total of the hydrogenated block copolymers (b) and (c);

an amount of vinyl bond before hydrogenation of the polymer block (C) is 1 mol % or more and 25 mol % or less, an amount of vinyl bond before hydrogenation of the polymer block (B1) is more than 60 mol % and 100 mol % or less, and an amount of vinyl bond before hydrogenation of the polymer block (B2) is 40 mol % or more and 60 mol % or less;

degrees of hydrogenation of the hydrogenated block copolymers (b) and (c) are each 80 mol % or more;

a mass ratio of a content of the hydrogenated block copolymer (b) to a content of the hydrogenated block copolymer (c), (b)/(c), is 90/10 to 10/90; and a mass ratio of a content of the polypropylene resin (a) to a total content of the hydrogenated block copolymer (b) and the hydrogenated block copolymer (c), (a)/((b)+(c)), is 10/90 to 90/10.

[2]

The resin composition according to [1], wherein:

the hydrogenated block copolymer (b) and/or (c) is a hydrogenated block copolymer further comprising, at a molecular end, a polymer block (B3) having a conjugated diene compound as a main component;

an amount of vinyl bond before hydrogenation of the polymer block (B3) is 40 mol % or more and 100 mol % or less; and a total amount of the polymer block (B3) based on 100 mass % in total of the hydrogenated block copolymers (b) and (c) is 1 to 10 mass %.

[3]

The resin composition according to [1] or [2], wherein the hydrogenated block copolymer (c) is a hydrogenated block copolymer comprising, in the molecule, the polymer block (C) having the conjugated diene compound as the main component.

[4]

The resin composition according to any one of [1] to [3], wherein both the hydrogenated block copolymers (b) and (c) are hydrogenated block copolymers comprising, in each molecule, the polymer block (C) having the conjugated diene compound as the main component.

[5]

A resin composition comprising a polypropylene resin (a), a hydrogenated block copolymer (b), and a hydrogenated block copolymer (c), wherein:

the hydrogenated block copolymers (b) and (c) comprise, in each molecule, a vinyl aromatic compound unit and a conjugated diene compound unit;

a total amount of the vinyl aromatic compound unit in the hydrogenated block copolymer (b) is 1 to 15 mass %;

a total amount of the vinyl aromatic compound unit in the hydrogenated block copolymer (c) is 1 to 15 mass %;

degrees of hydrogenation of the hydrogenated block copolymers (b) and (c) are each 80 mol % or more;

a butylene content and/or a propylene content in the hydrogenated block copolymer (b) is more than 60 mol % and 100 mol % or less based on 100 mol % in total of the conjugated diene compound unit;

a tan δ peak obtained by a dynamic viscoelasticity measurement (1 Hz) of the hydrogenated block copolymer (b) is in a range of higher than −40° C. and 10° C. or lower;

a butylene content and/or a propylene content in the hydrogenated block copolymer (c) is 40 mol % or more and 60 mol % or less based on 100 mol % in total of the conjugated diene compound unit;

a tan δ peak obtained by the dynamic viscoelasticity measurement (1 Hz) of the hydrogenated block copolymer (c) is in a range of higher than −60° C. and −40° C. or lower;

the hydrogenated block copolymer (b) and/or (c) has a crystallization peak at −20 to 80° C. and has a heat of crystallization of 0.1 to 10 J/g;

the hydrogenated block copolymers (b) and (c) neither have a crystallization peak at a position other than −20 to 80° C. nor have a heat of crystallization of less than 0.1 J/g and more than 10 J/g;

a mass ratio of a content of the hydrogenated block copolymer (b) to a content of the hydrogenated block copolymer (c), (b)/(c), is 90/10 to 10/90; and a mass ratio of a content of the polypropylene resin (a) to a total content of the hydrogenated block copolymer (b) and the hydrogenated block copolymer (c), (a)/((b)+(c)), is 10/90 to 90/10.

[6]

The resin composition according to [5], wherein the hydrogenated block copolymer (c) has the crystallization peak at −20 to 80° C. and has the heat of crystallization of 0.1 to 10 J/g.

[7]

The resin composition according to [5] or [6], wherein both the hydrogenated block copolymers (b) and (c) have the crystallization peak at −20 to 80° C. and have the heat of crystallization of 0.1 to 10 J/g.

[8]

The resin composition according to any of [1] to [7], wherein the mass ratio of the content of the hydrogenated block copolymer (b) to the content of the hydrogenated block copolymer (c), (b)/(c), is 75/25 to 40/60.

[9]

The resin composition according to any of [1] to [8], wherein the polypropylene resin (a) comprises a propylene-α-olefin random copolymer having a propylene content of 98 mass % or less.

[10]

The resin composition according to any of [1] to [9], wherein in wide angle X ray diffractometry, an intensity ratio of diffraction peak intensity (I(14)) at a scattering angle (2θ) of 14° to diffraction peak intensity (I(15)) at a scattering angle (2θ) of 15°, I(14)/I(15), is 0.1 or more and less than 1.4.

[11]

The resin composition according to any of [1] to [10], wherein in measurement by cross fractionation chromatography, an integral elution volume at −20° C. or lower is 0.1% or more and less than 20% of a total volume, an integral elution volume in a range of higher than −20° C. and lower than 60° C. is 8% or more and less than 85% of the total volume, and an integral elution volume in a range of 60° C. or higher and 150° C. or lower is 8% or more and less than 85% of the total volume.

[12]

The resin composition according to any of [1] to [11], wherein in measurement by cross fractionation chromatography, a molecular weight distribution (Mw/Mn) of an eluted component in a range of 10° C. or higher and lower than 60° C. is 1.50 or less.

[13]

A molded body comprising the resin composition according to any of [1] to [12].

[14]

A sheet comprising the resin composition according to any of [1] to [12].

[15]

A tube comprising the resin composition according to any of [1] to [12].

Advantageous Effects of Invention

The resin composition according to the present invention can have a good balance among the flexibility, transparency, anisotropy, low stickiness, and low temperature impact resistance of a molded body thereof.

DESCRIPTION OF EMBODIMENTS

Hereinafter, an embodiment for carrying out the present invention (hereinafter, simply referred to as the "present embodiment") will be described in detail. The present embodiment is given for illustrating the present invention and is not intended to limit the present invention to the contents described below. The present invention can be carried out by making various changes or modifications without departing from the scope of the present invention.

The resin composition of the present embodiment comprises a polypropylene resin (a), a hydrogenated block copolymer (b), and a hydrogenated block copolymer (c), wherein: the hydrogenated block copolymer (b) is a hydrogenated block copolymer comprising, in the molecule, a polymer block (B1) having a conjugated diene compound as a main component, and a polymer block (S) having a vinyl aromatic compound as a main component; the hydrogenated block copolymer (c) is a hydrogenated block copolymer comprising, in the molecule, a polymer block (B2) having a conjugated diene compound as a main component, and a polymer block (S) having a vinyl aromatic compound as a main component; the hydrogenated block copolymer (b)

and/or (c) is a hydrogenated block copolymer further comprising, in the molecule, a polymer block (C) having a conjugated diene compound as a main component; in the hydrogenated block copolymer (b), a content of the polymer block (C) is 20 mass % or less, a content of the polymer block (B1) is 73 to 97 mass %, and a content of the polymer block (S) is 1 to 15 mass %; in the hydrogenated block copolymer (c), a content of the polymer block (C) is 20 mass % or less, a content of the polymer block (B2) is 73 to 97 mass %, and a content of the polymer block (S) is 1 to 15 mass %; a total amount of the polymer block (C) is 1 to 20 mass %, and a total amount of the polymer blocks (C) and (S) is 3 to 27 mass %, based on 100 mass % in total of the hydrogenated block copolymers (b) and (c); an amount of vinyl bond before hydrogenation of the polymer block (C) is 1 mol % or more and 25 mol % or less, an amount of vinyl bond before hydrogenation of the polymer block (B1) is more than 60 mol % and 100 mol % or less, and an amount of vinyl bond before hydrogenation of the polymer block (B2) is 40 mol % or more and 60 mol % or less; degrees of hydrogenation of the hydrogenated block copolymers (b) and (c) are each 80 mol % or more; a mass ratio of a content of the hydrogenated block copolymer (b) to a content of the hydrogenated block copolymer (c), (b)/(c), is 90/10 to 10/90; and a mass ratio of a content of the polypropylene resin (a) to a total content of the hydrogenated block copolymer (b) and the hydrogenated block copolymer (c), (a)/((b)+(c)), is 10/90 to 90/10.

The resin composition according to the present embodiment configured as mentioned above is excellent in the balance among the flexibility, transparency, anisotropy, low stickiness, and low temperature impact resistance of a molded body thereof.

In the present specification, the hydrogenated block copolymer (b) and the hydrogenated block copolymer (c) together are also simply referred to as a "hydrogenated block copolymer".

The resin composition of the present embodiment mentioned above can also be defined as follows: the resin composition of the present embodiment comprises a polypropylene resin (a), a hydrogenated block copolymer (b), and a hydrogenated block copolymer (c), wherein: the hydrogenated block copolymers (b) and (c) comprise, in each molecule, a vinyl aromatic compound unit and a conjugated diene compound unit; a total amount of the vinyl aromatic compound unit in the hydrogenated block copolymer (b) is 1 to 15 mass %; a total amount of the vinyl aromatic compound unit in the hydrogenated block copolymer (c) is 1 to 15 mass %; degrees of hydrogenation of the hydrogenated block copolymers (b) and (c) are each 80 mol % or more; a butylene content and/or a propylene content in the hydrogenated block copolymer (b) is more than 60 mol % and 100 mol % or less based on 100 mol % in total of the conjugated diene compound unit; a tan δ peak obtained by the dynamic viscoelasticity measurement (1 Hz) of the hydrogenated block copolymer (b) is in the range of higher than −40° C. and 10° C. or lower; a butylene content and/or a propylene content in the hydrogenated block copolymer (c) is 40 mol % or more and 60 mol % or less based on 100 mol % in total of the conjugated diene compound unit; a tan δ peak obtained by the dynamic viscoelasticity measurement (1 Hz) of the hydrogenated block copolymer (c) is in the range of higher than −60° C. and −40° C. or lower; the hydrogenated block copolymer (b) and/or (c) has a crystallization peak at −20 to 80° C. and has a heat of crystallization of 0.1 to 10 J/g; the hydrogenated block copolymers (b) and (c) neither have a crystallization peak at a position other than −20 to 80° C. nor have a heat of crystallization of less than 0.1 J/g and more than 10 J/g; a mass ratio of a content of the hydrogenated block copolymer (b) to a content of the hydrogenated block copolymer (c), (b)/(c), is 90/10 to 10/90; and a mass ratio of a content of the polypropylene resin (a) to a total content of the hydrogenated block copolymer (b) and the hydrogenated block copolymer (c), (a)/((b)+(c)), is 10/90 to 90/10.

The resin composition defined as described above is also excellent in the balance among the flexibility, transparency, anisotropy, low stickiness, and low temperature impact resistance of a molded body thereof.

<Polypropylene RESIN (a)>

Examples of the polypropylene resin (a) include, but are not particularly limited to, random polypropylene resins, homopolypropylene resins, and block polypropylene resins.

In this context, the term "random" for the random polypropylene means that propylene and monomers other than propylene are copolymerized so that the monomers other than propylene are randomly incorporated into the propylene chain so as not to substantially form a chain of the monomers other than propylene.

The random polypropylene is not particularly limited as long as the content of the propylene unit is less than 99 mass %. Preferred examples of the random polypropylene include random copolymers of propylene and ethylene, and random copolymers of propylene and α-olefins. The polypropylene resin (a) more preferably comprises a propylene-α-olefin random copolymer having a propylene content of 98 mass % or less. In the case of using such a polypropylene resin (a), the flexibility, transparency, anisotropy, and low temperature impact resistance of the resulting molded body tend to be better.

Examples of the α-olefin include, but are not limited to, ethylene, 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. An α-olefin having 2 to 8 carbon atoms is preferred. Examples thereof include ethylene, 1-butene, 3-methyl-1-butene, 1-hexene, and 4-methyl-1-pentene. These α-olefins can be used alone or in combination of two or more. Also, the random polypropylene can also be used alone or in combination of two or more.

Among the random polypropylenes, at least one member selected from the group consisting of a propylene-ethylene random copolymer, a propylene-1-butene random copolymer, and a propylene-ethylene-1-butene ternary random copolymer is more preferably used from the viewpoint of the flexibility, transparency, anisotropy, and low temperature impact resistance of a molded body of the resin composition.

The random polypropylene is a random copolymer of propylene and ethylene or a random copolymer of propylene and an α-olefin having 4 to 12 carbon atoms, wherein the content of the ethylene or α-olefin unit in the random polypropylene is preferably more than 1 mass % and less than 40 mass %, and the content of the propylene unit is preferably 60 mass % or more and less than 99 mass %, from the viewpoint of the flexibility, transparency, anisotropy, and low temperature impact resistance of the resulting molded body. From similar viewpoints, the content of the ethylene or α-olefin unit is more preferably more than 2 mass % and less than 30 mass %, further preferably 2.5 mass % or more and less than 25 mass %, still further preferably 3 mass % or more and less than 20 mass %. The content of the propylene unit is more preferably 70 mass % or more and less than 98 mass %, further preferably 75 mass % or more and less than 97.5 mass %, still further preferably 80 mass % or more and less than 97 mass %.

The melt flow rate (MFR; conforming to ISO 1133, 230° C.) of the random polypropylene is preferably 1 to 30 g/10 minutes, more preferably 1 to 25 g/10 minutes, further preferably 2 to 20 g/10 minutes, still further preferably 3 to 15 g/10 minutes, from the viewpoint of the workability and low stickiness of the resulting resin composition.

The catalyst for use in producing the random polypropylene is not particularly limited. For example, a polymerization method using a stereoregular catalyst is preferred. Examples of the stereoregular catalyst include, but are not limited to, Ziegler catalysts and metallocene catalysts. Among these catalysts, a metallocene catalyst is preferred from the viewpoint of the flexibility, transparency, low stickiness, and low temperature impact resistance of a molded body of the resin composition.

The molecular weight distribution (Mw/Mn) of the random polypropylene is preferably 3.5 or less from the viewpoint of the low stickiness, tear strength, low temperature impact resistance, and kink resistance of a molded body of the resin composition. The Mw/Mn is more preferably 3.0 or less, further preferably 2.8 or less. The lower limit is not particularly limited and is preferably 1.5 or more. Particularly preferably, the random polypropylene is obtained by polymerization using a metallocene catalyst, and its molecular weight distribution (Mw/Mn) is 1.5 or more and 3.5 or less. The molecular weight distribution of the random polypropylene is determined from the ratio of a weight average molecular weight (Mw) to a number average molecular weight (Mn) obtained by GPC measurement.

<Hydrogenated Block Copolymer>

The resin composition of the present embodiment comprises two types of hydrogenated block copolymers (hydrogenated block copolymer (b) and hydrogenated block copolymer (c)) differing in configuration and thereby contributes to the exertion of excellent flexibility, transparency, anisotropy, low stickiness, and low temperature impact resistance. Both the hydrogenated block copolymer (b) and the hydrogenated block copolymer (c) according to the present embodiment comprise, in each molecule, a polymer block comprising a unit derived from a conjugated diene compound and a unit derived from a vinyl aromatic compound.

In the present embodiment, the conjugated diene compound that may be used in each polymer block of the hydrogenated block copolymer is a diolefin having a pair of conjugated double bonds. Examples of the diolefin include, but are not limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and farnesene. Particularly, general examples of the diolefin include 1,3-butadiene and isoprene. These conjugated dienes may be used alone or in combination of two or more.

In the present embodiment, examples of the vinyl aromatic compound that may be used in each polymer block of the hydrogenated block copolymer include, but are not limited to, vinyl aromatic compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene. Among them, styrene, α-methylstyrene, or 4-methylstyrene is preferably used from the viewpoint of availability and productivity. Styrene is particularly preferred. The polymer block (S) may be constituted by one vinyl aromatic compound unit or may be constituted by two or more vinyl aromatic compound units.

(Hydrogenated Block Copolymer (b))

The hydrogenated block copolymer (b) according to the present embodiment comprises, in the molecule, a polymer block (B1) having a conjugated diene compound as a main component (hereinafter, also simply referred to as a "polymer block (B1)"), and a polymer block (S) having an aromatic vinyl compound as a main component (hereinafter, also simply referred to as a "polymer block (S)"). Specifically, the hydrogenated block copolymer (b) comprises, in the molecule, a vinyl aromatic compound unit and a conjugated diene compound unit.

In the present specification, the phrase "having . . . as a main component" means containing 60 mass % or more of the monomer unit in the polymer block.

The content of the conjugated diene compound in the polymer block (B1) having a conjugated diene compound as a main component is preferably 70 mass % or more, more preferably 80 mass % or more, further preferably 90 mass % or more, from the viewpoint of the flexibility, transparency, and low temperature impact resistance of the resulting molded body. The content of the vinyl aromatic compound in the polymer block (S) having a vinyl aromatic compound as a main component is preferably 70 mass % or more, more preferably 80 mass % or more, further preferably 90 mass % or more, from the viewpoint of the low stickiness and low temperature impact resistance of the resulting molded body.

The content of the conjugated diene compound and the content of the vinyl aromatic compound can be measured by nuclear magnetic resonance spectrometry (NMR).

In the present specification, the "conjugated diene compound unit" is a unit forming the hydrogenated block copolymer and means a unit derived from a monomer of a conjugated diene compound. The "vinyl aromatic compound unit" is a unit forming the hydrogenated block copolymer and means a unit derived from a monomer of a vinyl aromatic compound.

The "amount of vinyl bond before hydrogenation" in each polymer block of the hydrogenated block copolymer according to the present embodiment means the percentage (mol %) of pre-hydrogenated conjugated dienes attached by 1,2 bonds and 3,4-bonds relative to those attached by 1,2-bonds, 3,4-bonds, and 1,4-bonds. The amount of vinyl bond before hydrogenation (hereinafter, also simply referred to as a "amount of vinyl bond") can be measured by nuclear magnetic resonance spectrometry (NMR) and can be specifically measured by a method described in Examples mentioned later.

The amount of vinyl bond before hydrogenation of the polymer block (B1) is more than 60 mol % and 100 mol % or less from the viewpoint of the flexibility and transparency of the resulting molded body. From similar viewpoints, the amount of vinyl bond before hydrogenation of the polymer block (B1) is preferably 65 to 95 mol %, more preferably 70 to 90 mol %.

The amount of vinyl bond can be controlled by use of a vinylating agent such as a polar compound or a Lewis base (e.g., ether or amine).

In the present embodiment, when the hydrogenated block copolymer (c) does not comprise the polymer block (C) mentioned later in the molecule, the hydrogenated block copolymer (b) further comprises the polymer block (C) in the molecule. The polymer block (C) preferably comprises the hydrogenated block copolymer (c) and more preferably comprises both the hydrogenated block copolymer (b) and the hydrogenated block copolymer (c), from the viewpoint of the flexibility, transparency, and anisotropy of the resulting molded body.

The polymer block (C) is a polymer block having a conjugated diene compound as a main component, and its amount of vinyl bond is 1 to 25 mol % from the viewpoint of dispersibility in a polypropylene resin and from the viewpoint of the flexibility, transparency, and low stickiness of a molded body of the resulting resin composition. From similar viewpoints, the amount of vinyl bond of the polymer block (C) is preferably 3 to 22 mol %, more preferably 5 to 20 mol %.

The amount of vinyl bond can be controlled by use of a vinylating agent such as a polar compound or a Lewis base (e.g., ether or amine).

The degree of hydrogenation of the hydrogenated block copolymer (b), i.e., the degree of hydrogenation of all the conjugated diene compound units contained in the hydrogenated block copolymer (b), is 80 mol % or more and is preferably 85 mol % or more, more preferably 90 mol % or more, further preferably 95 mol % or more, from the viewpoint of the flexibility, transparency, anisotropy, and low stickiness of the resulting molded body.

The degree of hydrogenation of all unsaturated group units contained in the conjugated diene monomer units of the hydrogenated block copolymer (b) can be measured by a method described in Examples mentioned later.

The degree of hydrogenation can be controlled by, for example, the amount of a hydrogenation catalyst. The hydrogenation rate can be controlled by, for example, the amount of a hydrogenation catalyst, the amount of hydrogen fed, pressure, or temperature.

The butylene content and/or propylene content of the hydrogenated block copolymer (b) is more than 60 mol % and 100 mol % or less and is preferably 65 to 95 mol %, more preferably 70 to 90 mol %, based on 100 mol % in total of the conjugated diene compound unit from the viewpoint of the flexibility and transparency of the resulting molded body. The butylene content and/or propylene content can be measured by a method described in Examples mentioned later.

The butylene content and/or propylene content can be controlled by use of a vinylating agent such as a polar compound or a Lewis base (e.g., ether or amine) or by the degree of hydrogenation.

In the present embodiment, a tan δ peak obtained by subjecting the hydrogenated block copolymer (b) to dynamic viscoelasticity measurement (1 Hz) is in the range of higher than −40° C. and 10° C. or lower. The tan δ peak is preferably in the range of −37 to 0° C., more preferably in the range of −35 to −10° C., from the viewpoint of the flexibility, transparency, and anisotropy of the resulting molded body. The tan δ peak can be measured by a method described in Examples mentioned later.

The tan δ peak can be controlled by use of a vinylating agent such as a polar compound or a Lewis base (e.g., ether or amine), and by the degree of hydrogenation.

In the present embodiment, when the hydrogenated block copolymer (c) has neither a specific crystallization peak nor heat of crystallization mentioned later, the hydrogenated block copolymer (b) has a specific crystallization peak and heat of crystallization. It is further required that the hydrogenated block copolymers (b) and (c) should neither have a crystallization peak at a position other than −20 to 80° C. nor have a heat of crystallization of less than 0.1 J/g and more than 10 J/g.

Preferably, the hydrogenated block copolymer (c) has a specific crystallization peak and heat of crystallization, and more preferably, both the hydrogenated block copolymer (b) and the hydrogenated block copolymer (c) have a specific crystallization peak and heat of crystallization, from the viewpoint of the flexibility, transparency, and anisotropy of the resulting molded body.

The specific crystallization peak and heat of crystallization mentioned above are a crystallization peak at −20 to 80° C. and a heat of crystallization of 0.1 to 10 J/g, from the viewpoint of the flexibility, transparency, and low stickiness of the resulting molded body. From similar viewpoints, the temperature range involving the crystallization peak is preferably −10 to 70° C., more preferably 0 to 60° C. The heat of crystallization is preferably 1.0 to 7.5 J/g, more preferably 1.5 to 5 J/g.

The temperature range involving the crystallization peak, and the heat of crystallization can be measured by a method described in Examples mentioned later.

The crystallization peak temperature range and the heat of crystallization can be controlled by the content of the polymer block (C), by use of a vinylating agent such as a polar compound or a Lewis base (e.g., ether or amine), and by the degree of hydrogenation.

In the present embodiment, the hydrogenated block copolymer (b) preferably comprises the following polymer block (B3) at the molecular end from the viewpoint of the flexibility, transparency, and anisotropy of the resulting molded body. In this context, the polymer block (B3) has a conjugated diene compound as a main component and has an amount of vinyl bond of 40 mol % or more and 100 mol % or less.

Examples of the structure of the hydrogenated block copolymer (b) of the present embodiment include, but are not particularly limited to, structures represented by the following general formulas:

 (C-B1)$_n$-S,

 (C-B1-S)$_n$,

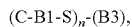 (C-B1-S)$_n$-(B3),

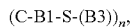 (C-B1-S-(B3))$_n$,

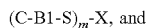 (C-B1-S)$_m$-X, and

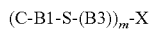 (C-B1-S-(B3))$_m$-X wherein, C, B1, S, and B3 represent the polymer blocks (C), (B1), and (S) and a polymer block (B3) mentioned later, respectively; when there are a plurality of polymer blocks (C), (B1), (S), or (B3), these polymer blocks may be different from or the same as each other; n represents an integer of 1 or larger, preferably 1 to 3; m represents an integer of 2 or larger, preferably 2 to 6; and X represents a residue of a coupling agent or a residue of a polyfunctional initiator.

A polymer represented by the structural formula C-B1-S or C-B1-S-(B3) is particularly preferred.

(Hydrogenated Block Copolymer (c))

The hydrogenated block copolymer (c) according to the present embodiment comprises, in the molecule, a polymer block (B2) having a conjugated diene compound as a main component (hereinafter, also simply referred to as a "polymer block (B2)"), and a polymer block (S). Specifically, the hydrogenated block copolymer (c) comprises, in the molecule, a vinyl aromatic compound unit and a conjugated diene compound unit. The polymer block (S) in the hydrogenated block copolymer (b) can be applied to the polymer block (S) in the hydrogenated block copolymer (c).

The content of the conjugated diene compound in the polymer block (B2) is preferably 70 mass % or more, more preferably 80 mass % or more, further preferably 90 mass % or more, from the viewpoint of the flexibility, transparency, and low temperature impact resistance of the resulting molded body. The content of the vinyl aromatic compound in the polymer block (S) is preferably 70 mass % or more, more preferably 80 mass % or more, further preferably 90 mass % or more, from the viewpoint of the low stickiness and low temperature impact resistance of the resulting molded body.

The content of the conjugated diene compound and the content of the vinyl aromatic compound can be measured by nuclear magnetic resonance spectrometry (NMR).

The amount of vinyl bond of the polymer block (B2) is 40 mol % or more and 60 mol % or less from the viewpoint of the low temperature impact resistance of the resulting molded body. From similar viewpoints, the amount of vinyl bond of the polymer block (B2) is preferably 42 to 58 mol %, more preferably 45 to 55 mol %.

The amount of vinyl bond can be controlled by use of a vinylating agent such as a polar compound or a Lewis base (e.g., ether or amine).

In the present embodiment, when the hydrogenated block copolymer (b) does not comprise the polymer block (C) in the molecule, the hydrogenated block copolymer (c) further comprises the polymer block (C) in the molecule. From the viewpoint mentioned above, the polymer block (C) preferably comprises the hydrogenated block copolymer (c) and more preferably comprises both the hydrogenated block copolymer (b) and the hydrogenated block copolymer (c).

The degree of hydrogenation of the hydrogenated block copolymer (c), i.e., the degree of hydrogenation of all the conjugated diene compound units contained in the hydrogenated block copolymer (c), is 80 mol % or more and is preferably 85 mol % or more, more preferably 90 mol % or more, further preferably 95 mol % or more, from the viewpoint of the flexibility, transparency, anisotropy, and low stickiness of the resulting molded body.

The degree of hydrogenation of the hydrogenated block copolymer (c) can be measured and controlled as described about the hydrogenated block copolymer (b).

The butylene content and/or propylene content of the hydrogenated block copolymer (c) is 40 mol % or more and 60 mol % or less and is preferably 42 to 58 mol %, more preferably 45 to 55 mol %, based on 100 mol % in total of the conjugated diene compound unit from the viewpoint of the low stickiness and low temperature impact resistance of the resulting molded body.

The butylene content and/or propylene content of the hydrogenated block copolymer (c) can be measured and controlled as described about the hydrogenated block copolymer (b).

In the present embodiment, a tan δ peak obtained by subjecting the hydrogenated block copolymer (c) to dynamic viscoelasticity measurement (1 Hz) is in the range of higher than −60° C. and −40° C. or lower. The tan δ peak is preferably in the range of −58 to −42° C., more preferably in the range of −55 to −45° C., from the viewpoint of the low stickiness and low temperature impact resistance of the resulting molded body.

The tan δ peak of the hydrogenated block copolymer (c) can be measured and controlled as described about the hydrogenated block copolymer (b).

In the present embodiment, when the hydrogenated block copolymer (b) has neither the specific crystallization peak nor heat of crystallization mentioned above, the hydrogenated block copolymer (c) has the specific crystallization peak and heat of crystallization. It is further required that the hydrogenated block copolymers (b) and (c) should neither have a crystallization peak at a position other than −20 to 80° C. nor have a heat of crystallization of less than 0.1 J/g and more than 10 J/g.

Preferably, the hydrogenated block copolymer (c) has the specific crystallization peak and heat of crystallization, and more preferably, both the hydrogenated block copolymer (b) and the hydrogenated block copolymer (c) have the specific crystallization peak and heat of crystallization, from the viewpoint of the flexibility, transparency, anisotropy, and low stickiness of the resulting molded body.

In the present embodiment, the hydrogenated block copolymer (c) preferably comprises a polymer block (B3) at the molecular end from the viewpoint of the flexibility, transparency, and anisotropy of the resulting molded body. In this context, the polymer block (B3) has a conjugated diene compound as a main component and has an amount of vinyl bond of 40 mol % or more and 100 mol % or less. Specifically, the polymer block (B3) in the hydrogenated block copolymer (b) can be applied to the polymer block (B3) in the hydrogenated block copolymer (c).

Examples of the structure of the hydrogenated block copolymer (c) of the present embodiment include, but are not particularly limited to, structures represented by the following general formulas:

(C-B2)$_n$-S,

(C-B2-S)$_n$,

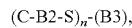
(C-B2-S)$_n$-(B3),

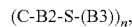
(C-B2-S-(B3))$_n$,

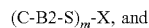
(C-B2-S)$_m$-X, and

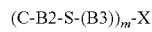
(C-B2-S-(B3))$_m$-X wherein, C, B2, S, and B3 represent the polymer blocks (C), (B2), and (S) and a polymer block (B3) mentioned later, respectively; when there are a plurality of polymer blocks (C), (B2), (S), or (B3), these polymer blocks may be different from or the same as each other; n represents an integer of 1 or larger, preferably 1 to 3; m represents an integer of 2 or larger, preferably 2 to 6; and X represents a residue of a coupling agent or a residue of a polyfunctional initiator.

A polymer represented by the structural formula C-B2-S or C-B2-S-(B3) is particularly preferred.

The weight average molecular weights (Mw) (hereinafter, also referred to as "Mw") of the hydrogenated block copolymers (b) and (c) are preferably 100,000 to 300,000, more preferably 130,000 to 280,000, further preferably 150,000 to 260,000, from the viewpoint of the blocking resistance of the hydrogenated block copolymer and from the viewpoint of the workability, flexibility, transparency, and low stickiness of a molded body of the resulting polypropylene resin composition.

The weight average molecular weights (Mw) of the hydrogenated block copolymers (b) and (c) are weight average molecular weights (Mw) each determined as the molecular weight of the chromatogram peak in gel permeation chromatography (hereinafter, also referred to as "GPC") measurement on the basis of a calibration curve obtained from the measurement of commercially available standard polystyrene (created by using the peak molecular weight of standard polystyrene). The molecular weight distribution of the hydrogenated block copolymer can also be determined from similar measurement by GPC. The molecular weight distribution is the ratio of the weight average molecular weight (Mw) to a number average molecular weight (Mn).

In the GPC measurement, the molecular weight distributions (Mw/Mn) of the hydrogenated block copolymers (b) and (c) are preferably 1.30 or less, more preferably 1.20 or less, further preferably 1.15 or less, still further preferably 1.10 or less.

The melt flow rates (MFR; conforming to ISO 1133) of the hydrogenated block copolymers (b) and (c) are preferably in the range of 0.1 to 12 g/10 minutes, more preferably 0.5 to 10 g/10 minutes, further preferably 1.0 to 8 g/10 minutes, still further preferably 1.5 to 5.0 g/10 minutes, from the viewpoint of the workability, flexibility, transparency and low stickiness, etc. of a molded body of the resulting polypropylene resin composition.

(Method for Producing Hydrogenated Block Copolymers (b) and (c))

The method for producing the hydrogenated block copolymers (b) and (c) according to the present embodiment is not particularly limited. The hydrogenated block copolymer can be produced, for example, by performing polymerization in an organic solvent with an organic alkali metal compound as a polymerization initiator to obtain a block copolymer, followed by hydrogenation reaction. The mode of polymerization may be batch polymerization, continuous polymerization, or a combination thereof. A batch polymerization method is preferred from the viewpoint of obtaining a block copolymer having a narrow molecular weight distribution and high strength.

The polymerization temperature is generally 0 to 150° C., preferably 20 to 120° C., more preferably 40 to 100° C., further preferably 55 to 65° C. The polymerization time differs depending on the polymer of interest and is usually 24 hours or shorter, preferably 0.1 to 10 hours. The polymerization time is more preferably 0.5 to 3 hours from the viewpoint of obtaining a block copolymer having a narrow molecular weight distribution and high strength. The atmosphere of the polymerization system is not particularly limited and can have any pressure range sufficient for maintaining nitrogen and a solvent in a liquid phase. It is preferred that impurities, for example, water, oxygen, and carbon dioxide, which inactivate an initiator and living polymers should be absent in the polymerization system.

Examples of the organic solvent include, but are not particularly limited to: aliphatic hydrocarbons such as n-butane, isobutane, n-pentane, n-hexane, n-heptane, and n-octane; alicyclic hydrocarbons such as cyclohexane, cycloheptane, and methylcyclopentane; and aromatic hydrocarbons such as benzene, xylene, toluene, and ethylbenzene.

The organic alkali metal compound serving as a polymerization initiator is preferably an organolithium compound. An organic monolithium compound, an organic dilithium compound, or an organic polylithium compound is used as the organolithium compound. Specific examples of the organolithium compound include, but are not limited to, ethyl lithium, n-propyl lithium, isopropyl lithium, n-butyl lithium, sec-butyl lithium, t-butyl lithium, phenyl lithium, hexamethylene dilithium, butadienyl lithium, and isopropenyl dilithium. Among them, n-butyl lithium or sec-butyl lithium is preferred from the viewpoint of polymerization activity.

The amount of the organic alkali metal compound used as a polymerization initiator depends on the molecular weight of the block copolymer of interest and is generally preferably in the range of 0.01 to 0.5 phm (parts by mass based on 100 parts by mass of monomers), more preferably in the range of 0.03 to 0.3 phm, still more preferably in the range of 0.05 to 0.15 phm.

The amount of vinyl bond of the hydrogenated block copolymer can be adjusted by using a compound such as a Lewis base, for example, ether or amine, as a vinylating agent. The amount of the vinylating agent used can be adjusted according to the amount of vinyl bond of interest. Also, polymer blocks differing in amount of vinyl bond can be produced in polymer blocks each having a conjugated diene compound as a main component, by adding the vinylating agent and a metal alkoxide mentioned later under two or more divided conditions.

Examples of the vinylating agent include, but are not limited to, ether compounds, ether-containing compounds having two or more oxygen atoms, and tertiary amine compounds.

Examples of the tertiary amine compounds include, but are not limited to, pyridine, N,N,N',N'-tetramethylethylenediamine, tributylamine, tetramethylpropanediamine, 1,2-dipiperidinoethane, and bis[2-(N,N-dimethylamino)ethyl] ether. These compounds may be used alone or may be used in combination of two or more. The tertiary amine compound is preferably a compound having two amines. Among others, a compound having a structure that exhibits symmetry in the molecule is more preferred, and N,N,N',N'-tetramethylethylenediamine, bis[2-(N,N-dimethylamino)ethyl] ether, or 1,2-dipiperidinoethane is further preferred.

In the present embodiment, the copolymerization for the hydrogenated block copolymer may be performed in the presence of the coexisting vinylating agent mentioned above, organolithium compound, and alkali metal alkoxide. In this context, the alkali metal alkoxide is a compound represented by the general formula MOR (wherein M is an alkali metal, and R is an alkyl group).

The alkali metal of the alkali metal alkoxide is preferably sodium or potassium from the viewpoint of a high amount of vinyl bond, a narrow molecular weight distribution, a high polymerization rate, and a high block content. The alkali metal alkoxide is not limited and is preferably sodium alkoxide, lithium alkoxide, or potassium alkoxide having an alkyl group having 2 to 12 carbon atoms, more preferably sodium alkoxide or potassium alkoxide having an alkyl group having 3 to 6 carbon atoms, further preferably sodium t-butoxide, sodium t-pentoxide, potassium t-butoxide, or potassium t-pentoxide. Among them, sodium t-butoxide or sodium t-pentoxide which is sodium alkoxide is still further preferred.

In the case of polymerizing in the presence of the coexisting vinylating agent, organolithium compound, and alkali metal alkoxide in the polymerization step for the hydrogenated block copolymer according to the present embodiment, the molar ratio of the vinylating agent to the organolithium compound (vinylating agent/organolithium compound) and the molar ratio of the alkali metal alkoxide to the organolithium compound (alkali metal alkoxide/organolithium compound) are preferably the following molar ratios for the coexistence:

vinylating agent/organolithium compound of 0.2 to 3.0, and alkali metal alkoxide/organolithium compound of 0.01 to 0.3.

The vinylating agent/organolithium compound molar ratio is preferably 0.2 or more from the viewpoint of a high amount of vinyl bond and a high polymerization rate and is preferably less than 3.0 from the viewpoint of obtaining a narrow molecular weight distribution and high hydrogenation activity. The alkali metal alkoxide/organolithium compound molar ratio is preferably 0.01 or more from the viewpoint of a high amount of vinyl bond, a high polymerization rate, and a high block content and is preferably 0.3 or less from the viewpoint of obtaining a narrow molecular weight distribution and high hydrogenation activity. This achieves improvement in polymerization rate and can increase the amount of vinyl bond of the hydrogenated block copolymer of interest. In addition, this can narrow a molecular weight distribution and further tends to improve a block content. As a result, performance to be imparted to a polypropylene resin composition, i.e., flexibility, transparency, anisotropy, low stickiness, and low temperature impact resistance, tend to be further improved.

The vinylating agent/organolithium compound molar ratio in the polymerization step is preferably 0.8 or more from the viewpoint of a high amount of vinyl bond and a high polymerization rate, preferably 2.5 or less from the viewpoint of a narrow molecular weight distribution and high hydrogenation activity, and more preferably in the range of 1.0 or more and 2.0 or less.

The alkali metal alkoxide/organolithium compound molar ratio is preferably 0.02 or more from the viewpoint of a high amount of vinyl bond, a high polymerization rate, and a high block content, preferably 0.2 or less from the viewpoint of a narrow molecular weight distribution and high hydrogenation activity, more preferably 0.03 or more and 0.1 or less, further preferably 0.03 or more and 0.08 or less.

The alkali metal alkoxide/vinylating agent molar ratio is preferably 0.010 or more from the viewpoint of a high amount of vinyl bond, a high polymerization rate, and a high block content and is preferably 0.100 or less from the viewpoint of achieving a narrow molecular weight distribution and obtaining high hydrogenation activity. The alkali metal alkoxide/vinylating agent molar ratio is more preferably 0.012 or more and 0.080 or less, further preferably 0.015 or more and 0.06 or less, still further preferably 0.015 or more and 0.05 or less.

An inactivating agent for the vinylating agent can also be used as an approach of producing blocks differing in amount of vinyl bond in polymer blocks each having a conjugated diene compound as a main component. Examples of the inactivating agent include alkyl metal compounds. The inactivating agent is selected from alkyl aluminum, alkyl zinc, and alkyl magnesium having 1 to 20 carbon atoms per alkyl substituent, and mixtures thereof.

In the present embodiment, the hydrogenation method is not particularly limited. For example, the block copolymer obtained as described above can be hydrogenated by the supply of hydrogen in the presence of a hydrogenation catalyst to obtain a hydrogenated block copolymer having the hydrogenated double bond residues of conjugated diene compound units.

The hydrogenated block copolymer can be pelletized to produce pellets of the hydrogenated block copolymer. Examples of the pelletizing method include: a method of extruding the hydrogenated block copolymer into strands from a single-screw or twin-screw extruder, and cutting the strands in water using a rotating blade fitted in front of a die; a method of extruding the hydrogenated block copolymer into strands from a single-screw or twin-screw extruder, cooling the strands in water or in air, and then cutting the strands using a strand cutter; and a method of melt-mixing the hydrogenated block copolymer with an open roll or a Banbury mixer, then molding the hydrogenated block copolymer into a sheet using a roll, further cutting the sheet into strips, and then cutting the strips into cube-shaped pellets using a pelletizer. The molded body of the hydrogenated block copolymer pellets is not particularly limited by its size or shape.

The hydrogenated block copolymer, preferably, the pellets thereof, can be blended, if necessary, with a pellet blocking prevention agent for the purpose of preventing pellet blocking. Examples of the pellet blocking prevention agent include, but are not particularly limited to, calcium stearate, magnesium stearate, zinc stearate, polyethylene, polypropylene, ethylenebisstearamide, talc, and amorphous silica. Calcium stearate, polyethylene, or polypropylene is preferred from the viewpoint of the transparency of the resulting random polypropylene composition and a tube-shaped molded body or a sheet-shaped molded body comprising the same. The preferred amount thereof is 500 to 6000 ppm based on the hydrogenated block copolymer. The more preferred amount thereof is 1000 to 5000 ppm based on the hydrogenated block copolymer. The pellet blocking prevention agent is preferably blended in a state attached to pellet surface and may be contained to some extent in the inside of the pellets.

[Resin Composition]

The resin composition of the present embodiment comprises the polypropylene resin (a), the hydrogenated block copolymer (b), and the hydrogenated block copolymer (c) mentioned above at a specific ratio. Specifically, in the resin composition of the present embodiment, the mass ratio of the content of the hydrogenated block copolymer (b) to the content of the hydrogenated block copolymer (c), (b)/(c), is 90/10 to 10/90 from the viewpoint of the balance among the flexibility, transparency, anisotropy, low stickiness, and low temperature impact resistance of the resulting molded body. From similar viewpoints, the mass ratio (b)/(c) is preferably 90/10 to 40/60, more preferably 80/20 to 50/50, particularly preferably 75/25 to 50/50. In the resin composition of the present embodiment, the mass ratio of the content of the polypropylene resin (a) to the total content of the hydrogenated block copolymer (b) and the hydrogenated block copolymer (c), (a)/((b)+(c)), is 10/90 to 90/10 from the viewpoint of the balance among the flexibility, transparency, anisotropy, low stickiness, and low temperature impact resistance of the resulting molded body. From similar viewpoints, the mass ratio (a)/((b)+(c)) is preferably 15/85 to 85/15, more preferably 20/80 to 80/20.

The hydrogenated block copolymers (b) and (c) contained in the resin composition of the present embodiment each have the following configuration.

In the hydrogenated block copolymer (b), the content of the polymer block (C) is 20 mass % or less, the content of the polymer block (B1) is 73 to 97 mass %, and the content of the polymer block (S) is 1 to 15 mass %.

In the hydrogenated block copolymer (c), the content of the polymer block (C) is 20 mass % or less, the content of the polymer block (B2) is 73 to 97 mass %, and the content of the polymer block (S) is 1 to 15 mass %.

The total amount of the polymer block (C) is 1 to 20 mass %, and the total amount of the polymer blocks (C) and (S) is 3 to 27 mass %, based on 100 mass % in total of the hydrogenated block copolymers (b) and (c).

The resin composition of the present embodiment comprises the hydrogenated block copolymers (b) and (c) at such contents and thereby comprises at least three polymer blocks differing in amount of vinyl bond. Specifically, the resin composition of the present embodiment has: the polymer block (C) which has a low vinyl content of 1 to 25 mol % and contributes to low stickiness; the polymer block (B2) which has a moderate vinyl content of 40 mol % or more and 60 mol % or less and contributes to low temperature impact resistance; and the polymer block (B1) which has a high vinyl content of more than 60 mol % and 100 mol % or less and contributes to flexibility, transparency, and anisotropy, and is thereby excellent, particularly, in the balance among low temperature impact resistance, flexibility, and transparency through the cooperation of the properties of these polymer blocks. As described above, the resin composition of the present embodiment can particularly improve the balance between low temperature impact resistance and flexibility which have been considered to be in a trade-off relationship.

From viewpoints similar to those described above, the content of the polymer block (C) in the hydrogenated block copolymer (b) is preferably 1 to 20 mass %, more preferably 3 to 17 mass %, further preferably 5 to 15 mass %. The content of the polymer block (B1) in the hydrogenated block copolymer (b) is preferably 78 to 93 mass %, more preferably 82 to 90 mass %. The content of the polymer block (S) in the hydrogenated block copolymer (b) is preferably 2 to 12 mass %, more preferably 3 to 9 mass %.

From viewpoints similar to those described above, the content of the polymer block (C) in the hydrogenated block copolymer (c) is preferably 1 to 20 mass %, more preferably 3 to 17 mass %, further preferably 5 to 15 mass %. The content of the polymer block (B1) in the hydrogenated block copolymer (c) is preferably 78 to 93 mass %, more preferably 82 to 90 mass %. The content of the polymer block (S) in the hydrogenated block copolymer (c) is preferably 2 to 12 mass %, more preferably 3 to 9 mass %.

The content of each polymer block in the hydrogenated block copolymers (b) and (c) can be measured by a method described in Examples mentioned later.

In the resin composition of the present embodiment, the total amount of the vinyl aromatic compound unit in the hydrogenated block copolymer (b) is 1 to 15 mass % and is preferably 2 to 12 mass %, more preferably 3 to 9 mass %, from the viewpoint of the flexibility, transparency, and low stickiness of the resulting molded body. From viewpoints similar to those described above, the total amount of the vinyl aromatic compound unit in the hydrogenated block copolymer (c) is 1 to 15 mass % and is preferably 2 to 12 mass %, more preferably 3 to 9 mass %.

The total amount of the vinyl aromatic compound unit in each of the hydrogenated block copolymers (b) and (c) can be measured by a method described in Examples mentioned later.

In the resin composition of the present embodiment, preferably, a tan δ peak obtained by the dynamic viscoelasticity measurement (1 Hz) of the hydrogenated block copolymer (b) is in the range of higher than −40° C. and 10° C. or lower, and a tan δ peak obtained by the dynamic viscoelasticity measurement (1 Hz) of the hydrogenated block copolymer (c) is in the range of higher than −60° C. and −40° C. or lower, from the viewpoint of the flexibility, transparency, and low temperature impact resistance of the resulting molded body.

In the resin composition of the present embodiment, the total amount of the polymer block (B3) is preferably 1 to 10 mass %, more preferably 1.5 to 7 mass %, further preferably 2 to 5 mass %, based on 100 mass % in total of the hydrogenated block copolymers (b) and (c) from the viewpoint of the flexibility, transparency, and anisotropy of the resulting molded body.

In the resin composition of the present embodiment, the intensity ratio of diffraction peak intensity (I(14)) at a scattering angle (2θ) of 14° to diffraction peak intensity (I(15)) at a scattering angle (2θ) of 15°, I(14)/I(15), in wide angle X ray diffractometry is preferably 0.1 or more and less than 1.4, from the viewpoint of the flexibility, transparency, and anisotropy of the resulting molded body. From similar viewpoints, the intensity ratio I(14)/I(15) is more preferably 0.2 to 1.35, further preferably 0.3 to 1.3.

The intensity ratio I(14)/I(15) can be controlled by, for example, the ratio among the polypropylene resin (a), the hydrogenated block copolymer (b), and the hydrogenated block copolymer (c) and the type of the polypropylene resin (a) and can be measured by a method described in Examples mentioned later.

In the measurement of the resin composition of the present embodiment or a molded body by cross fractionation chromatography (hereinafter, also referred to as "CFC"), preferably, an integral elution volume at −20° C. or lower is 0.1% or more and less than 20% of the total volume, an integral elution volume in the range of higher than −20° C. and lower than 60° C. is 5% or more and less than 90% of the total volume, and an integral elution volume in the range of 60° C. or higher and 150° C. or lower is 5% or more and less than 90% of the total volume. More preferably, the integral elution volume in the range of higher than −20° C. and lower than 60° C. is 8% or more and less than 85% of the total volume, and the integral elution volume in the range of 60° C. or higher and 150° C. or lower is 8% or more and less than 85% of the total volume. The "total volume" means the total volume of the resin composition or the molded body subjected to CFC measurement.

When the behavior described above is observed, the balance among the low temperature impact resistance, flexibility, transparency, and low stickiness of a molded body of the resulting resin composition tends to be better.

From similar viewpoints, the integral elution volume of −20° C. or lower is more preferably 0.1% or more and less than 15%, further preferably 0.1% or more and less than 10%, of the total volume. The integral elution volume in the range of higher than −20° C. and lower than 60° C. is more preferably 10% or more and less than 80%, further preferably 20% or more and less than 70%, of the total volume. The integral elution volume in the range of 60° C. or higher and 150° C. or lower is more preferably 10% or more and less than 80%, further preferably 20% or more and less than 70% by mass, of the total volume.

The CFC elution volumes can be controlled by, for example, the ratio among the polypropylene resin (a), the hydrogenated block copolymer (b), and the hydrogenated block copolymer (c) and the content of the polymer block (C) in the hydrogenated block copolymer (b) and the hydrogenated block copolymer (c). The CFC elution volumes can be measured by a method described in Examples mentioned later.

In the measurement of the resin composition of the present embodiment by the cross fractionation chromatography (CFC), the molecular weight distribution (Mw/Mn) of an eluted component in the range of 10° C. or higher and lower than 60° C. is preferably 1.50 or less, more preferably 1.05 or more and 1.50 or less.

When the behavior described above is observed, the flexibility, transparency, and low temperature impact resistance of a molded body of the resulting resin composition tend to be better.

The molecular weight distribution (Mw/Mn) of an eluted component in the range of 10° C. or higher and lower than 60° C. is more preferably 1.10 or more, further preferably 1.15 or more, from the viewpoint of the workability of the hydrogenated block copolymer.

The molecular weight distribution (Mw/Mn) of an eluted component in the range of 10° C. or higher and lower than 60° C. is more preferably 1.45 or less, further preferably 1.40 or less, from the viewpoint of the balance among flexibility, transparency, and low temperature impact resistance.

The molecular weight distribution can be controlled by, for example, the hydrogenated block copolymer (b) and the hydrogenated block copolymer (c). The molecular weight distribution of the CFC eluted component can be measured by a method described in Examples mentioned later.

[Molded Body]

The molded body of the present embodiment comprises the resin composition of the present embodiment. Examples of the molded body can include, but are not limited to, tubes, sheets, films, bags, medical molded bodies, for example, medical tubes, medical films, and medical infusion bags, and packaging materials, for example, food packaging materials and apparel packaging materials.

The molded body of the present embodiment can be obtained by a molding method mentioned below. The molding method, for example, for a tube, is not particularly limited. For example, the resin composition is charged into an extruder and molten, and the resultant can be tubulated through a die and cooled in water or in air to prepare a tube. A single-screw or multiple-screw extruder can be used as the extruder. Also, a multi-layer tube can be formed by multi-layer extrusion using a plurality of extruders. Alternatively, the resin composition may be molded directly into a tube from the extruder used for producing the polypropylene resin composition.

The shape of the tube is not particularly limited. For example, a round or oval tube is usually used. The diameter of the tube is not particularly limited and is, for example, preferably, 1 to 50 mm, more preferably 2 to 30 mm, further preferably 3 to 20 mm, in terms of outside diameter. The thickness of the tube is preferably 0.3 to 30 mm, more preferably 0.4 to 20 mm, further preferably 0.5 to 10 mm.

The tube of the present embodiment may be prepared as a multi-layer tube by laminating an additional polymer without inhibiting the purpose of the present embodiment. The polymer can be used alone or in combination of two or more as a single layer or as a multi-layer laminate that may differ in type among the layers. The layer containing the polymer in the tube having such a multi-layer structure may be positioned as an innermost layer, an intermediate layer, or an outermost layer according to the desired performance to be imparted. In the present embodiment, a reinforcing yarn braid or a helical reinforcing body can be wrapped around the tube and prepared as a pressure-resistant tube (hose) in order to improve pressure resistance, etc. while maintaining flexibility by suppressing increase in thickness. The reinforcing yarn braid is disposed in the inside or between layers in the thickness direction, and can employ vinylon, polyamide, polyester, aramide fiber, carbon fiber, metal wire, or the like. The helical reinforcing body is disposed at the outer circumference and can employ a metal, a plastic, or the like.

The method for producing the sheet of the present embodiment is not particularly limited. For example, a T-die method or an inflation method can be adopted as an extrusion molding method of charging the resin composition into an extruder. For example, usual air-cooling inflation molding, air-cooling two-stage inflation molding, high-speed inflation molding, or water-cooling inflation molding can be adopted as the inflation molding. Also, a blow molding method such as direct blow or injection blow, or a press molding method can be adopted. A single-screw or multiple-screw extruder can be used as the extruder. Also, a multi-layer sheet can be formed by multi-layer extrusion using a plurality of extruders. Alternatively, the polypropylene resin composition may be molded directly into a sheet from the extruder used for producing the polypropylene resin composition.

In general, a sheet-shaped molded body having a thickness of 0.005 mm or larger and smaller than 0.2 mm is referred to as a film, and a sheet having a thickness of 0.2 mm or larger and 50 mm or smaller is referred to as a sheet. In the specification of the present application, the "sheet" encompasses the film and the sheet. The thickness of the sheet-shaped molded body of the present embodiment is not particularly limited and is preferably in the range of 0.005 mm to 0.5 mm, more preferably 0.01 mm to 0.3 mm, from the viewpoint of moldability, flexibility, etc.

The bag refers to a pouched molded body that can be formed from the sheet of the present embodiment. Examples of the bag include bags for food packaging, bags for apparel packaging, medical bags, for example, medical infusion bags, and bags for chemical packaging.

EXAMPLES

Hereinafter, the present embodiment will be specifically described with reference to Examples. However, the present embodiment is not limited by these Examples. In each of Examples and Comparative Examples, the preparation of a hydrogenated block copolymer, the production of a resin composition and a sheet-shaped molded body, and the comparison of physical properties were performed by the methods described below. In this respect, the properties of the hydrogenated block copolymer and the physical properties of the resin composition and the sheet-shaped molded body were measured as follows.

<Measurement Method>

1) Content of each Polymer Block in Hydrogenated Block Copolymer

Approximately 20 mL of a polymer solution sampled in each step of a polymerization process for a pre-hydrogenated block copolymer was injected to a hermetically sealed 100 mL bottle containing 0.50 mL of n-propylbenzene and approximately 20 mL of toluene as internal standards to prepare a sample.

This sample was measured with a gas chromatograph (manufactured by Shimadzu Corporation; GC-14B) equipped with a packed column carrying Apiezon grease. The amount of residual monomers in the polymer solution was determined from calibration curves of butadiene monomers and styrene monomers obtained beforehand to confirm that the degrees of polymerization of butadiene monomers and styrene monomers were 100%. The content of each polymer block was calculated according to the expression given below.

The degree of polymerization of butadiene was measured at a constant temperature of 90° C., and the degree of polymerization of styrene was performed under conditions involving holding at 90° C. for 10 minutes and temperature increase to 150° C. at a rate of 10° C./min.

Content of each block=(Total amount of monomers fed in each step)/(Amount of all monomers)× 100 mass %

2) Amount of Vinyl Bond before Hydrogenation of Hydrogenated Block Copolymer

Polymers sampled in each step of a polymerization process for a pre-hydrogenated block copolymer were measured by the proton nuclear magnetic resonance ($^1$H-NMR) method. The measurement conditions involved: measuring apparatus: JNM-LA400 (manufactured by JEOL Ltd.), solvent: deuterochloroform, sample concentration: 50 mg/mL, observation frequency: 400 MHz, chemical shift reference: tetramethylsilane, pulse delay: 2.904 seconds, the number of scans: 64 times, pulse width: 45°, and measurement temperature: 26° C. The amount of vinyl bond was calculated from the ratios of 1,4-bonds and 1,2-bonds by calculating an integrated value of signals per 1H of each bond from an integrated value of signals attributed to 1,4-bonds and 1,2-bonds.

The amount of vinyl bond of each polymer sampled in each step of a polymerization process for a pre-hydrogenated block copolymer was calculated to calculate the respective amount of vinyl bonds of the block (C) and the blocks (B1) or (B2).

3) Degree of Hydrogenation of Unsaturated Bond Based on Conjugated Diene Compound Unit of Hydrogenated Block Copolymer Hydrogenated block polymers after hydrogenation were measured by proton nuclear magnetic resonance ($^1$H-NMR). The measurement conditions and the method for processing measurement data were the same as in the paragraph 3). The degree of hydrogenation was determined by calculating integrated values of signals derived from remaining double bonds and signals derived from hydrogenated conjugated diene at 4.5 to 5.5 ppm, and calculating ratios thereof.

4) Butylene Content and/or Propylene Content Based on 100 mol % in Total of Conjugated Diene Compound Unit The total amount of conjugated diene compound units in a hydrogenated block copolymer, and a butylene content and/or a propylene content were measured by proton nuclear magnetic resonance ($^1$H-NMR) using polymers after hydrogenation. The measurement conditions and the method for processing measurement data were the same as in the paragraphs 3) and 4). The butylene content was determined by calculating an integrated value of signals attributed to butylene (hydrogenated 1,2-bonds) at 0 to 2.0 ppm of the spectrum, and calculating a ratio thereof.

5) Content of Aromatic Vinyl Compound Unit (Hereinafter, also Referred to as "Styrene Content") of Hydrogenated Block Copolymer Polymers after hydrogenation were measured by the proton nuclear magnetic resonance ($^1$H-NMR) method. The measurement conditions involved: measuring apparatus: JNM-LA400 (manufactured by JEOL Ltd.), solvent: deuterochloroform, sample concentration: 50 mg/mL, observation frequency: 400 MHz, chemical shift reference: tetramethylsilane, pulse delay: 2.904 seconds, the number of scans: 64 times, pulse width: 45°, and measurement temperature: 26° C. The styrene content was calculated using an integrated value of all styrene aromatic signals at 6.2 to 7.5 ppm of the spectrum.

The content of all aromatic vinyl compounds and the styrene content of the block (S) were also confirmed by calculating the content of aromatic vinyl compound units in each polymer sampled in each step of a polymerization process for a pre-hydrogenated block copolymer.

6) DSC Measurement 10 mg of each hydrogenated block copolymer was precisely weighed into an aluminum pan. A differential scanning calorimeter (DSC) (manufactured by TA Instruments, Q2000) was used. The temperature was increased at a rate of temperature increase of 10° C./min from an initial temperature of −50° C. to 150° C. in a nitrogen atmosphere (flow rate: 50 mL/min), kept at 150° C. for 5 minutes, and then decreased to −50° C. at a rate of 10° C./min, followed by measurement.

A crystallization peak appearing in the course of temperature decrease on the drawn DSC curve was regarded as a crystallization temperature (° C.), and the quantity of heat indicated by the crystallization peak area was regarded as the heat of crystallization (J/g).

7) Dynamic Viscoelasticity Measurement of Hydrogenated Block Copolymer

The temperature-loss tangent (tan δ) spectrum obtained from solid viscoelasticity (1 Hz) was measured by the following method to obtain a tan δ peak temperature.

A sample for measurement was loaded in the torsion type geometry of an apparatus ARES (trade name, manufactured by TA Instruments), and the following samples were measured under conditions involving an effective measurement length of 25 mm, a strain of 0.5%, a frequency of 1 Hz, a measurement range from −100° C. to 100° C., and a rate of temperature increase of 3° C./min.

Sample: hydrogenated block copolymers (b-1) to (b-3) and hydrogenated block copolymers (c-1) to (c-2) were each press-molded into a sheet having a thickness of 2 mm at 200° C. for 5 minutes. Then, the sheet was cut into a width of 10 mm and a length of 35 mm to prepare samples for measurement. Their tan δ peak temperatures were determined.

8) Wide Angle X Ray Diffractometry

Sheet-shaped molded bodies in 200 μm thickness obtained in Examples and Comparative Examples were used as test specimens. A nano-scale X ray structural evaluation apparatus NANO-Viewer manufactured by Rigaku Corp. was used, and the optical system employed X ray (wavelength: 0.154 nm) parallelized using point collimation (first slit: 0.4 mmϕ, second slit: 0.2 mmϕ, guard slit: 0.8 mmϕ). Each molded body was irradiated with incident X ray (edge incident) parallel to the molded body surface from the side.

In this respect, the sample thickness in the X ray incident direction was equal to or smaller than the sheet thickness.

The detector used was an imaging plate. The camera length was set to 74.5 mm, and the exposure time was set to 15 minutes.

In order to prevent air-derived scatter, the passage from the second slit through the detector was vacuumized.

Scatter correction was performed for empty cells and the background of the apparatus. The obtained two-dimensional scatter pattern was averaged in a fan-like fashion within the range of $-15°<\chi<15°$ ($\chi$: azimuth defined with the thickness direction of the molded body as 0°) to obtain a one-dimensional scatter profile.

The line connecting scattering intensity at 2θ=5° and scattering intensity at 2θ=30° in the obtained scatter profile was used as a baseline. Intensity at scattering peak top present at 2θ=14° (scattered by the (110) plane of the α crystals of the polypropylene resin) from the baseline was defined as I(14), and scattering intensity at 2θ=15° from the baseline was defined as I(15). The intensity ratio thereof (I(14)/I(15)) was calculated.

9) Flexibility of Sheet-Shaped Molded Body

Sheet-shaped molded bodies of 200 μm in thickness obtained in Examples and Comparative Examples. These molded bodies were punched into JIS No. 5 dumbbell shapes, and the tensile modulus (MPa) in the machine direction (MD) of each of the resulting samples was measured at a pulling rate of 200 mm/min using a tensile tester (Minebea Co., Ltd., Tg-5kN) in accordance with JIS K6251 and used as an index for flexibility. The obtained tensile modulus was evaluated according to the following criteria:

⊚: The tensile modulus was lower than 260 MPa.
◯: The tensile modulus was 260 MPa or higher and lower than 360 MPa.
Δ: The tensile modulus was 360 MPa or higher and lower than 460 MPa.
x: The tensile modulus was 460 MPa or higher.

10) Transparency of Sheet-Shaped Molded Body

Sheet-shaped molded bodies of 200 μm in thickness obtained in Examples and Comparative Examples were used. The haze value (%) was measured using a haze meter (manufactured by Nippon Denshoku Industries, Co., Ltd., NDH-1001DP) and used as an index for transparency. The obtained haze value was used in evaluation based on the criteria given below.

⊚: The haze value was less than 2%.
◯: The haze value was 2% or more and less than 5%.
Δ: The haze value was 5% or more and less than 7%.
x: The haze value was 7% or more.

11) Anisotropy of Sheet-Shaped Molded Body

Sheet-shaped molded bodies of 200 μm in thickness obtained in Examples and Comparative Examples were used. These molded bodies were punched into JIS No. 5 dumbbell shapes, and the tensile modulus (MPa) in the machine direction (MD) and in the transverse direction (TD) of each of the resulting samples was measured at a pulling rate of 200 mm/min using a tensile tester (Minebea Co., Ltd., Tg-5kN) in accordance with JIS K6251. The obtained tensile modulus (MD/TD) ratio was evaluated according to the following criteria:

⊚: The MD/TD value was in the range of 0.92 to 1.08.
◯: The MD/TD value was in the range of 0.89 to 1.11 (except for the range of ⊚ described above).
Δ: The MD/TD value was in the range of 0.85 to 1.15 (except for the ranges of ◯ and ⊚ described above).
x: The MD/TD value was less than 0.85 or more than 1.15.

12) Low Stickiness of Sheet-Shaped Molded Body

Sheet-shaped molded bodies of 200 μm in thickness obtained in Examples and Comparative Examples were each cut into 5 cm×8 cm and 4 cm×6 cm test specimens. Two sheets of the obtained test specimens were laminated (upper: 5 cm×8 cm, lower: 4 cm×5 cm). Then, a load of 500 g (size: 6 cm×10 cm×1 cm) was placed on the upper sheet and left standing for 60 seconds. When the sheets were then detached 180° at a rate of 100 mm/min, the tack strength (J) was measured using a tensile tester (Minebea Co., Ltd., Tg-5kN) and used as an index for low stickiness. The obtained tack strength was evaluated according to the following criteria:

⊚: The tack strength was smaller than 3 N.
◯: The tack strength was 3 N or larger and smaller than 5 N.
Δ: The tack strength was 5 N or larger and smaller than 10 N.
x: The tack strength was 10N or larger.

13) Low Temperature Impact Resistance of Sheet-Shaped Molded Body

Sheet-shaped molded bodies of 200 μm in thickness obtained in Examples and Comparative Examples were each cut into 20 cm×13 cm test specimens. Two sheets of the test specimens were laminated, and three sides thereof were then heat-sealed at 145° C. for 2 seconds to prepare a bag.

500 mL of water was added into the bag, and the remaining one side was further heat-sealed under the same conditions as above to prepare a water-containing bag.

The water-containing bag was further sterilized by steam and then left for 24 hours in a refrigerator of 4° C. When 10 bags of each example were then dropped from a height of 1.8 m, the breakage rate of the bags was measured and used as an index for low temperature impact resistance.

The obtained breakage rate was evaluated according to the following criteria:

⊚: The non-breakage rate was 100%.
◯: The non-breakage rate was 70% or more and less than 100%.
Δ: The non-breakage rate was 50% or more and less than 70%.
x: The non-breakage rate was less than 50%.

14) CFC Measurement of Molded Body of Resin Composition molded bodies obtained in Examples and Comparative Examples were used as test samples. An elution temperature-elution volume curve was measured by temperature rising elution fractionation as described below, and an elution volume at each temperature, an integral elution volume, and the molecular weight distribution of an eluted component were determined.

First, the temperature of a column containing a packing material was increased to 145° C. A sample solution containing a hydrogenated block copolymer dissolved in o-dichlorobenzene was introduced to the column, which was then kept at 140° C. for 30 minutes. Next, the temperature of the column was decreased to −20° C. at a rate of temperature decrease of 1° C./min and then kept for 60 minutes to deposit the sample on the packing material surface.

Then, the temperature of the column was sequentially increased at 5° C. intervals at a rate of temperature increase of 40° C./min. The concentration of a sample eluted at each temperature was detected. Then, the elution temperature-elution volume curve was measured from the elution volumes (mass %) of the samples and the corresponding intracolumn temperatures (° C.). The elution volume at each temperature and the molecular weight distribution were determined.

Apparatus: CFC type cross fractionation chromatograph (manufactured by Polymer Characterization, S.A.)
Detector: IR type infrared spectrophotometer (manufactured by Polymer Characterization, S.A.)
Detection wavelength: 3.42 μm
Column: Shodex HT-806M×3 (manufactured by Showa Denko K.K.)
Column calibration: monodisperse polystyrene (manufactured by Tosho Corp.)
Molecular weight calibration method: calibration method using standards (based on polystyrene)
Eluent: o-dichlorobenzene
Flow rate: 1.0 mL/min
Sample concentration: 120 mg/30 mL
Injection volume: 0.5 mL An integral elution volume (%) in the total volume at −20° C. or lower, an integral elution volume (%) in the total volume in the range of higher than −20° C. and lower than 60° C., an integral elution volume (%) in the total volume in the range of 60° C. or higher and 150° C. or lower, and the molecular weight distribution of an eluted component from 10 to 60° C. were determined from the obtained elution temperature-elution volume curve.

15) Weight Average Molecular Weight and Molecular Weight Distribution of Hydrogenated Block Copolymer The weight average molecular weight and molecular weight distribution of a hydrogenated block copolymer were determined by gel permeation chromatography (GPC) measurement (manufactured by Shimadzu Corporation, LC-10), and a molecular weight based on polystyrene was determined using columns TSKgel GMHXL (4.6 mm ID×30 cm, two columns) and a solvent tetrahydrofuran (THF) and using a commercially available standard polystyrene.

16) Melt Flow Rate (Hereinafter, also Referred to as "MFR") of Hydrogenated Block Copolymer The MFR of a hydrogenated block copolymer and a propylene resin was measured at 230° C. under a load of 2.16 Kg in accordance with ISO 1133.

Production Example 1

(Preparation of Hydrogenation Catalyst)

A hydrogenation catalyst used in hydrogenation reaction for a hydrogenated block copolymer was prepared by the following method: 1 L of dried and purified cyclohexane was charged into a reactor purged with nitrogen. To the reactor, 100 mmol of bis(η5-cyclopentadienyl) titanium dichloride was added, and a n-hexane solution containing 200 mmol of trimethyl aluminum was added with thorough stirring. The mixture was reacted at room temperature for 3 days.

(Preparation of Hydrogenated Block Copolymer (b-1))

Batch polymerization was performed using a tank reactor (internal volume: 10 L) equipped with a stirring device and a jacket. 1 L of cyclohexane was charged into the reactor. Then, 0.046 parts by mass of n-butyl lithium (hereinafter, also referred to as "Bu—Li") based on 100 parts by mass in total of monomers, and 0.05 mol of N,N,N',N'-tetramethylethylenediamine (hereinafter, also referred to as "TMEDA") as a vinylating agent based on 1 mol of Bu—Li were added to the reactor.

In step 1, a cyclohexane solution (butadiene concentration: 20 mass %) containing 10 parts by mass of butadiene was charged into the reactor over 10 minutes, followed by polymerization for 10 minutes. The polymerization temperature in step 1 was controlled to 65° C.

In step 2, 1.55 mol of TMEDA based on 1 mol of Bu—Li and 0.05 mol of sodium t-pentoxide (hereinafter, referred to as NaOAm) based on 1 mol of Bu—Li were added to the reactor, and a cyclohexane solution (butadiene concentration: 20 mass %) containing 85 parts by mass of butadiene was charged into the reactor over 60 minutes, followed by polymerization for 10 minutes. The polymerization temperature in step 2 was controlled to 60° C.

In step 3, a cyclohexane solution (styrene concentration: 20 mass %) containing 5 parts by mass of styrene was charged into the reactor over 10 minutes, followed by polymerization for 10 minutes. The polymerization temperature in step 3 was controlled to 65° C.

Each obtained polymer was sampled in each step of the polymerization process for the block copolymer preparation process.

To the obtained block copolymer, the hydrogenation catalyst was added at a concentration of 100 ppm in terms of titanium based on 100 parts by mass of the block copolymer, followed by hydrogenation reaction at a temperature of 70° C. at a hydrogen pressure of 0.7 MPa. After subsequent addition of methanol, 0.25 parts by mass of octadecyl-3-(3,5-di-t-butyl-4-hydroxyphenyl)propionate were added as a stabilizer to the block copolymer.

The obtained hydrogenated block copolymer (b-1) had a degree of hydrogenation of 99%, MFR of 2.9 g/10 minutes, a weight average molecular weight (Mw) of 250,000, and a molecular weight distribution (Mw/Mn) of 1.07. The results of analyzing the obtained hydrogenated block copolymer (b-1) are shown in Table 1.

Production Example 2

(Preparation of Hydrogenated Block Copolymer (b-2))

A hydrogenated block copolymer (b-2) was produced by the same operation as in (b-1) except that: before step 1, 0.063 parts by mass of Bu—Li were used; in the first step, 6 parts by mass of styrene were used; step 1 was not performed; in step 2, 88 parts by mass of butadiene were used; and in step 3, 6 parts by mass of styrene were used to produce a block copolymer. The obtained hydrogenated block copolymer (b-2) had a styrene content of 12 mass %, a weight average molecular weight of 178,000, a molecular weight distribution of 1.12, a degree of hydrogenation of 99%, and MFR of 4.2 g/10 minutes.

The results of analyzing the obtained hydrogenated block copolymer (b-2) are shown in Table 1.

Production Example 3

(Preparation of Hydrogen Block Copolymer (b-3))

A hydrogenated block copolymer (b-3) was produced by the same operation as in (b-1) except that: in step 2, 82 parts by mass of butadiene were used; and in additional step 4, 3 parts by mass of butadiene were charged into the reactor over 10 minutes, followed by polymerization for 10 minutes to produce a block copolymer. The obtained hydrogenated block copolymer (b-3) had a styrene content of 5 mass %, a weight average molecular weight of 253,000, a molecular weight distribution of 1.09, a degree of hydrogenation of 99%, and MFR of 3.9 g/10 minutes.

The results of analyzing the obtained hydrogenated block copolymer (b-3) are shown in Table 1.

Production Example 4

(Preparation of Hydrogen Block Copolymer (c-1))

A hydrogenated block copolymer (c-1) was produced by the same operation as in (b-1) except that: before step 1, 0.050 parts by mass of Bu—Li were used; and before step 2, 0.65 mol of TMEDA was used, and NaOAm was not added to produce a block copolymer. The obtained hydrogenated block copolymer (c-1) had a styrene content of 5 mass %, a weight average molecular weight of 239,000, a molecular weight distribution of 1.08, a degree of hydrogenation of 99%, and MFR of 3.3 g/10 minutes.

The results of analyzing the obtained hydrogenated block copolymer (c-1) are shown in Table 1.

Production Example 5

(Preparation of Hydrogen Block Copolymer (c-2))

A hydrogenated block copolymer (c-2) was produced by the same operation as in (b-1) except that: before step 1, 0.095 parts by mass of Bu—Li were used; in the first step, 9 parts by mass of styrene were used; step 1 was not performed; before step 2, 0.65 mol of TMEDA was used, and NaOAm was not added; in step 2, 82 parts by mass of butadiene were used; and in step 3, 9 parts by mass of styrene were used to produce a block copolymer. The obtained hydrogenated block copolymer (c-2) had a styrene content of 18 mass %, a weight average molecular weight of 113,000, a molecular weight distribution of 1.07, a degree of hydrogenation of 99%, and MFR of 4.5 g/10 minutes.

The results of analyzing the obtained hydrogenated block copolymer (c-2) are shown in Table 1.

TABLE 1

| | | Block structural composition (mass %) | | | | | Amount of vinyl bond before hydrogenation (mol %) | | | Butylene/ propylene content (mol %) | Degree of hydro- genation (mol %) | DSC measurement | | Visco- elasticity Tg (° C.) |
|---|---|---|---|---|---|---|---|---|---|---|---|---|---|---|
| | | | | | | | | | | | | Crystalliza- tion tempe- rature (° C.) | Heat of crystalliza- tion (J/g) | |
| | | S | C | B1 or B2 | S | B3 | S + C | C | B1 or B2 | B3 | | | | | |
| Production Example 1 | b-1 | | 10 | 85 | 5 | | 15 | 15 | 78 | | 71.4 | 99 | 36.0 | 3.5 | −29 |
| Production Example 2 | b-2 | 6 | | 88 | 6 | | 12 | | 79 | | 79.0 | 99 | Not detected | Not detected | −32 |
| Production Example 3 | b-3 | | 10 | 82 | 5 | 3 | 15 | 15 | 78 | 79 | 71.4 | 99 | 35.5 | 3.4 | −30 |
| Production Example 4 | c-1 | | 10 | 85 | 5 | | 15 | 15 | 49 | | 45.4 | 99 | 42.5 | 3.7 | −48 |
| Production Example 5 | c-2 | 9 | | 84 | 9 | | 18 | | 51 | | 51.0 | 99 | Not detected | Not detected | −49 |

Production Example 6

(Preparation of Hydrogen Block Copolymer (b-4))

A hydrogenated block copolymer (b-4) was produced by the same operation as in (b-1) except that: before step 1, 0.01 mol of TMEDA was used; and before step 2, 1.4 mol of TMEDA was used to produce a block copolymer. The obtained hydrogenated block copolymer (b-4) had a styrene content of 5 mass %, a weight average molecular weight of 251,000, a molecular weight distribution of 1.07, a degree of hydrogenation of 99%, and MFR of 2.2 g/10 minutes.

The results of analyzing the obtained hydrogenated block copolymer (b-4) are shown in Table 2.

Production Example 7

(Preparation of Hydrogen Block Copolymer (b-5))

A hydrogenated block copolymer (b-5) was produced by the same operation as in (b-1) except that before step 2, 2.00 mol of TMEDA and 0.09 mol of NaOAm were used to produce a block copolymer. The obtained hydrogenated block copolymer (b-5) had a styrene content of 5 mass %, a weight average molecular weight of 259,000, a molecular weight distribution of 1.30, a degree of hydrogenation of 99%, and MFR of 4.5 g/10 minutes.

The results of analyzing the obtained hydrogenated block copolymer (b-5) are shown in Table 2.

Production Example 8

(Preparation of Hydrogen Block Copolymer (b-6))

A hydrogenated block copolymer (b-6) was produced by the same operation as in (b-1) except that a block copolymer was produced according to the block structural composition shown in Table 2. The obtained hydrogenated block copolymer (b-6) had a styrene content of 8 mass %, a weight average molecular weight of 252,000, a molecular weight distribution of 1.09, a degree of hydrogenation of 99%, and MFR of 5.2 g/10 minutes.

The results of analyzing the obtained hydrogenated block copolymer (b-6) are shown in Table 2.

Production Example 9

(Preparation of Hydrogen Block Copolymer (b-7))

A hydrogenated block copolymer (b-7) was produced by the same operation as in (b-1) except that: before step 1, 0.07 mol of TMEDA was used; and a block copolymer was produced according to the block structural composition shown in Table 2. The obtained hydrogenated block copolymer (b-7) had a styrene content of 4 mass %, a weight average molecular weight of 249,000, a molecular weight distribution of 1.07, a degree of hydrogenation of 99%, and MFR of 1.2 g/10 minutes.

The results of analyzing the obtained hydrogenated block copolymer (b-7) are shown in Table 2.

Production Example 10

(Preparation of Hydrogen Block Copolymer (b-8))

A hydrogenated block copolymer (b-8) was produced by the same operation as in (b-1) except that a block copolymer was produced according to the block structural composition shown in Table 2. The obtained hydrogenated block copolymer (b-8) had a styrene content of 2 mass %, a weight average molecular weight of 248,000, a molecular weight distribution of 1.07, a degree of hydrogenation of 99%, and MFR of 5.7 g/10 minutes.

The results of analyzing the obtained hydrogenated block copolymer (b-8) are shown in Table 2.

Production Example 11

(Preparation of Hydrogen Block Copolymer (b-9))

A hydrogenated block copolymer (b-9) was produced by the same operation as in (b-1) except that a block copolymer was produced according to the block structural composition shown in Table 2. The obtained hydrogenated block copolymer (b-9) had a styrene content of 13 mass %, a weight average molecular weight of 253,000, a molecular weight distribution of 1.10, a degree of hydrogenation of 99%, and MFR of 0.9 g/10 minutes.

The results of analyzing the obtained hydrogenated block copolymer (b-9) are shown in Table 2.

Production Example 12

(Preparation of Hydrogen Block Copolymer (b-10))

A hydrogenated block copolymer (b-10) was produced by the same operation as in (b-1) except that: before step 1, 0.01 mol of TMEDA was used; and a block copolymer was produced according to the block structural composition shown in Table 2. The obtained hydrogenated block copolymer (b-10) had a styrene content of 4 mass %, a weight average molecular weight of 249,000, a molecular weight distribution of 1.07, a degree of hydrogenation of 99%, and MFR of 5.6 g/10 minutes.

The results of analyzing the obtained hydrogenated block copolymer (b-10) are shown in Table 2.

Production Example 13

(Preparation of Hydrogen Block Copolymer (b-11))

A hydrogenated block copolymer (b-11) was produced by the same operation as in (b-1) except that: before step 1, 0.068 parts by mass of Bu—Li were used; a block copolymer was produced according to the block structural composition shown in Table 2; and the hydrogenation reaction was stopped in midstream. The obtained hydrogenated block copolymer (b-11) had a styrene content of 12 mass %, a weight average molecular weight of 241,000, a molecular weight distribution of 1.11, a degree of hydrogenation of 84%, and MFR of 2.7 g/10 minutes.

The results of analyzing the obtained hydrogenated block copolymer (b-11) are shown in Table 2.

Production Example 14

(Preparation of Hydrogen Block Copolymer (b-12))

A hydrogenated block copolymer (b-12) was produced by the same operation as in (b-1) except that: before step 1, 0.070 parts by mass of Bu—Li were used; and a block copolymer was produced according to the block structural composition shown in Table 2. The obtained hydrogenated block copolymer (b-12) had a styrene content of 5 mass %, a weight average molecular weight of 236,000, a molecular weight distribution of 1.08, a degree of hydrogenation of 99%, and MFR of 2.1 g/10 minutes.

The results of analyzing the obtained hydrogenated block copolymer (b-12) are shown in Table 2.

Production Example 15

(Preparation of Hydrogen Block Copolymer (b-13))

A hydrogenated block copolymer (b-13) was produced by the same operation as in (b-1) except that: before step 1, 0.070 parts by mass of Bu—Li were used; and a block copolymer was produced according to the block structural composition shown in Table 2. The obtained hydrogenated block copolymer (b-13) had a styrene content of 18 mass %, a weight average molecular weight of 239,000, a molecular weight distribution of 1.12, a degree of hydrogenation of 99%, and MFR of 1.6 g/10 minutes.

The results of analyzing the obtained hydrogenated block copolymer (b-13) are shown in Table 2.

Production Example 16

(Preparation of Hydrogen Block Copolymer (c-3))

A hydrogenated block copolymer (c-3) was produced by the same operation as in (c-1) except that before step 2, the amount of TMEDA was changed. The obtained hydrogenated block copolymer (c-3) had a styrene content of 4 mass %, a weight average molecular weight of 238,000, a molecular weight distribution of 1.07, a degree of hydrogenation of 99%, and MFR of 1.9 g/10 minutes.

The results of analyzing the obtained hydrogenated block copolymer (c-3) are shown in Table 2.

Production Example 17

(Preparation of Hydrogen Block Copolymer (c-4))

A hydrogenated block copolymer (c-4) was produced by the same operation as in (c-1) except that: before step 1, 0.01 parts by mass of TMEDA were used; and a block copolymer was produced according to the block structural composition shown in Table 2. The obtained hydrogenated block copolymer (c-4) had a styrene content of 3 mass %, a weight average molecular weight of 240,000, a molecular weight distribution of 1.09, a degree of hydrogenation of 99%, and MFR of 6.9 g/10 minutes.

The results of analyzing the obtained hydrogenated block copolymer (c-4) are shown in Table 2.

Production Example 18

(Preparation of Hydrogen Block Copolymer (c-5))

A hydrogenated block copolymer (c-5) was produced by the same operation as in (c-1) except that a block copolymer was produced according to the block structural composition shown in Table 2. The obtained hydrogenated block copolymer (c-5) had a styrene content of 6 mass %, a weight average molecular weight of 239,000, a molecular weight distribution of 1.08, a degree of hydrogenation of 99%, and MFR of 6.2 g/10 minutes.

The results of analyzing the obtained hydrogenated block copolymer (c-5) are shown in Table 2.

Production Example 19

(Preparation of Hydrogen Block Copolymer (c-6))

A hydrogenated block copolymer (c-6) was produced by the same operation as in (c-1) except that: before step 2, 0.67 parts by mass of TMEDA were used; and a block copolymer was produced according to the block structural composition shown in Table 2. The obtained hydrogenated block copolymer (c-6) had a styrene content of 13 mass %, a weight average molecular weight of 242,000, a molecular weight distribution of 1.10, a degree of hydrogenation of 99%, and MFR of 3.9 g/10 minutes.

The results of analyzing the obtained hydrogenated block copolymer (c-6) are shown in Table 2.

Production Example 20

(Preparation of Hydrogen Block Copolymer (c-7))

A hydrogenated block copolymer (c-7) was produced by the same operation as in (c-1) except that: a block copolymer was produced according to the block structural composition shown in Table 2; and the hydrogenation reaction was stopped in midstream. The obtained hydrogenated block copolymer (c-7) had a styrene content of 11 mass %, a weight average molecular weight of 241,000, a molecular weight distribution of 1.10, a degree of hydrogenation of 82%, and MFR of 3.5 g/10 minutes.

The results of analyzing the obtained hydrogenated block copolymer (c-7) are shown in Table 2.

Production Example 21

(Preparation of Hydrogen Block Copolymer (c-8))

A hydrogenated block copolymer (c-8) was produced by the same operation as in (c-1) except that: before step 1, 0.060 parts by mass of Bu—Li were used; and a block copolymer was produced according to the block structural composition shown in Table 2. The obtained hydrogenated block copolymer (c-8) had a styrene content of 4 mass %, a weight average molecular weight of 230,000, a molecular weight distribution of 1.07, a degree of hydrogenation of 99%, and MFR of 1.3 g/10 minutes.

The results of analyzing the obtained hydrogenated block copolymer (c-8) are shown in Table 2.

Production Example 22

(Preparation of Hydrogen Block Copolymer (c-9))

A hydrogenated block copolymer (c-9) was produced by the same operation as in (c-1) except that: before step 1, 0.060 parts by mass of Bu—Li were used; before step 1, 0.12 parts by mass of TMEDA were used; and a block copolymer was produced according to the block structural composition shown in Table 2. The obtained hydrogenated block copolymer (c-9) had a styrene content of 19 mass %, a weight average molecular weight of 234,000, a molecular weight distribution of 1.12, a degree of hydrogenation of 99%, and MFR of 0.8 g/10 minutes.

The results of analyzing the obtained hydrogenated block copolymer (c-9) are shown in Table 2.

Production Example 23

(Preparation of Hydrogen Block Copolymer (c-10))

A hydrogenated block copolymer (c-10) was produced by the same operation as in (c-1) except that before step 2, 0.30 parts by mass of TMEDA were used to produce a block copolymer. The obtained hydrogenated block copolymer (c-10) had a styrene content of 5 mass %, a weight average molecular weight of 237,000, a molecular weight distribution of 1.07, a degree of hydrogenation of 99%, and MFR of 1.4 g/10 minutes.

The results of analyzing the obtained hydrogenated block copolymer (c-10) are shown in Table 2.

TABLE 2

| | | Block structural composition (mass %) | | | | Amount of vinyl bond before hydrogenation (mol %) | | Butylene/ propylene content (mol %) | Degree of hydrogenation (mol %) | DSC measurement | | Viscoelasticity Tg (° C.) |
|---|---|---|---|---|---|---|---|---|---|---|---|---|
| | | C | B1 or B2 | S | S + C | C | B1 or B2 | | | Crystallization temperature (° C.) | Heat of crystallization (J/g) | |
| Production Example 6 | b-4 | 10 | 85 | 5 | 15 | 8 | 70 | 63.5 | 99 | 49.5 | 4.2 | −35 |
| Production Example 7 | b-5 | 10 | 85 | 5 | 15 | 17 | 92 | 84.1 | 99 | 30.5 | 3.1 | −19 |
| Production Example 8 | b-6 | 3 | 89 | 8 | 11 | 18 | 79 | 77.0 | 99 | 1.7 | 0.8 | −30 |
| Production Example 9 | b-7 | 17 | 79 | 4 | 21 | 21 | 78 | 67.9 | 99 | 46.0 | 6.2 | −29 |
| Production Example 10 | b-8 | 10 | 88 | 2 | 12 | 15 | 80 | 73.4 | 99 | 34.0 | 3.6 | −25 |
| Production Example 11 | b-9 | 5 | 82 | 13 | 18 | 15 | 80 | 76.3 | 99 | 19.0 | 1.7 | −28 |
| Production Example 12 | b-10 | 4 | 92 | 4 | 8 | 7 | 76 | 73.1 | 99 | 42.0 | 2.4 | −33 |
| Production Example 13 | b-11 | 12 | 76 | 12 | 24 | 15 | 77 | 68.5 | 84 | 17 | 1.9 | −37 |
| Production Example 14 | b-12 | 25 | 70 | 5 | 30 | 12 | 78 | 60.6 | 99 | 81.2 | 10.5 | −29 |
| Production Example 15 | b-13 | 9 | 73 | 18 | 27 | 15 | 80 | 72.9 | 99 | 34.9 | 3.3 | −30 |
| Production Example 16 | c-3 | 16 | 80 | 4 | 20 | 14 | 46 | 40.7 | 99 | 57.5 | 7.2 | −48 |
| Production Example 17 | c-4 | 4 | 93 | 3 | 7 | 7 | 50 | 48.2 | 99 | 28.5 | 2.3 | −49 |
| Production Example 18 | c-5 | 3 | 91 | 6 | 9 | 18 | 52 | 50.9 | 99 | 1.6 | 0.7 | −50 |
| Production Example 19 | c-6 | 5 | 82 | 13 | 18 | 13 | 58 | 55.4 | 99 | 29.5 | 1.6 | −44 |
| Production Example 20 | c-7 | 11 | 78 | 11 | 22 | 17 | 48 | 44.2 | 82 | 13.5 | 1.7 | −59 |
| Production Example 21 | c-8 | 23 | 73 | 4 | 27 | 18 | 48 | 40.8 | 99 | 80.2 | 9.8 | −49 |
| Production Example 22 | c-9 | 10 | 71 | 19 | 29 | 25 | 50 | 46.9 | 99 | 41.8 | 3.8 | −50 |
| Production Example 23 | c-10 | 10 | 85 | 5 | 15 | 15 | 35 | 32.9 | 99 | 47.3 | 4 | −39 |

<Polypropylene Resin (a)>

The following polypropylene resins (a-1) to (a-3) were used in Examples and Comparative Examples.

(a-1): propylene-ethylene random copolymer ("PC630A" (trade name), manufactured by SunAllomer Ltd., MFR=6.8 g/10 minutes)

(a-2): propylene-ethylene random copolymer ("PM931M" (trade name), manufactured by SunAllomer Ltd., MFR=25.1 g/10 minutes)

(a-3): propylene homopolymer ("PL500A" (trade name), manufactured by SunAllomer Ltd., MFR=3.0 g/10 minutes)

<Production of Resin Composition and Sheet-Shaped Molded Body>

Examples 1 to 22 and Comparative Examples 1 to 14

Each of the polypropylene resins (a-1) to (a-3), each of the hydrogenated block copolymers (b-1) to (b-13), and each of the hydrogenated block copolymers (c-1) to (c-10) were dry-blended at the ratio (indicated by part by mass) shown in Tables 3 and 4, and the blend was melt-kneaded under conditions involving 200° C., 150 rpm, and an extrusion output of 5 Kg/h using a twin-screw extruder (L/D=42, 30 mmφ) to produce pellets of the resin composition.

The sheet-shaped molded bodies of Examples 1 to 22 and Comparative Examples 1 to 14 were prepared as described below, and each physical property was measured. Specifically, the resin composition pellets were applied to a T-die in a single-screw sheet extruder (40 mmφ) under conditions involving a resin temperature of 200° C., the number of screw revolutions of 30 rpm, a T-die lip opening of 0.5 mm, a T-die slit width of 400 mm, a roller surface temperature of 45° C., and a take-up rate of 3 m/min to prepare sheet-shaped molded bodies having a thickness of approximately 200 μm. The thickness was adjusted by changing the number of screw revolutions, the extrusion output, the take-up rate, etc. The obtained evaluation results are shown in Tables 3 and 4. Specifically, each physical property was evaluated on a scale of ⊚ to x, and the balance among the physical properties was evaluated.

TABLE 3

|  |  | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|---|---|---|---|---|
| Polypropylene resin (a) | a-1 | 70 | 70 | 70 | 70 | 70 | 40 | 80 |  |  | 70 | 70 | 70 | 70 | 70 | 70 | 8 | 95 |
|  | a-2 |  |  |  |  |  |  |  | 70 |  |  |  |  |  |  |  |  |  |
|  | a-3 |  |  |  |  |  |  |  |  | 70 |  |  |  |  |  |  |  |  |
| Hydrogenated block copolymer (b) | b-1 | 15 | 23 | 7 | 15 |  | 30 | 10 | 15 | 20 |  | 30 |  |  |  |  | 46 | 2.5 |
|  | b-2 |  |  |  |  | 15 |  |  |  |  |  |  |  | 30 |  | 15 |  |  |
|  | b-3 |  |  |  |  |  |  |  |  |  |  |  |  |  |  |  |  |  |
| Hydrogenated block copolymer (c) | c-1 | 15 | 7 | 23 |  | 15 | 30 | 10 | 15 | 10 | 10 |  | 30 |  |  |  | 46 | 2.5 |
|  | c-2 |  |  |  | 15 |  |  |  |  |  |  |  |  |  | 30 | 15 |  |  |
| Mass ratio (b)/(c) |  | 50/50 | 76.7/23.3 | 23.3/76.7 | 50/50 | 50/50 | 50/50 | 50/50 | 50/50 | 66.7/33.3 | 66.7/33.3 | 100/0 | 0/100 | 100/0 | 0/100 | 50/50 | 50/50 | 50/50 |
| Mass ratio [(a)/((b)+(c))] |  | 70/30 | 70/30 | 70/30 | 70/30 | 70/30 | 40/60 | 80/20 | 70/30 | 70/30 | 70/30 | 70/30 | 70/30 | 70/30 | 70/30 | 70/30 | 8/92 | 95/5 |
| Intensity ratio (I14/I15) of wide angle X ray diffractometry |  | 0.98 | 0.82 | 1.21 | 1.35 | 1.22 | 0.79 | 1.15 | 1.13 | 1.39 | 0.81 | 0.79 | 1.29 | 1.7 | 2.30 | 1.78 | Not detected | 2.04 |
| Physical property | Flexibility | ◎ | ◎ | △ | △ | ○ | ◎ | ○ | ○ | △ | ◎ | ◎ | × | △ | × | × | ◎ | × |
|  | Transparency | ◎ | ◎ | △ | △ | △ | ◎ | ○ | ○ | △ | ◎ | ◎ | △ | △ | × | × | ○ | △ |
|  | Anisotropy | ◎ | ○ | ○ | △ | △ | ○ | ○ | △ | ○ | ○ | ◎ | ◎ | △ | × | △ | × | × |
|  | Low stickiness | ◎ | △ | ◎ | ◎ | ○ | △ | △ | ◎ | ◎ | ○ | △ | ◎ | △ | ◎ | ○ | × | ◎ |
|  | Impact resistance | ◎ | 4.8 | ◎ | ◎ | ◎ | ◎ | ◎ | ◎ | △ | ○ | × | △ | × | ◎ | ○ | △ | × |
| CFC measurement | Elution volume ratio (%) −20° C. or lower | 4.4 | 4.8 | 3.7 | 19.2 | 18.5 | 4.9 | 4.9 | 3.2 | 2.3 | 4.7 | 4.4 | 3.9 | 32.3 | 30.6 | 32.2 | 4.8 | 3.1 |
|  | Higher than −20° C. and lower than 60° C. | 29.1 | 28.9 | 29.5 | 14.2 | 14.8 | 57.1 | 19.2 | 28.9 | 29.1 | 29.0 | 29.2 | 29.5 | 1.5 | 2.4 | 1.9 | 87.4 | 4.7 |
|  | 60° C. or higher and 150° C. or lower | 66.5 | 66.3 | 66.8 | 66.6 | 66.7 | 38.0 | 75.9 | 67.9 | 68.6 | 66.3 | 66.4 | 66.6 | 66.2 | 67.0 | 65.9 | 7.8 | 92.2 |
| Molecular weight distribution of eluted component (10° C. or higher and lower than 60° C.) |  | 1.31 | 1.29 | 1.33 | 1.32 | 1.34 | 1.31 | 1.32 | 1.33 | 1.29 | 1.3 | 1.27 | 1.34 | 2.2 | 3.1 | 2.8 | 1.31 | 1.49 |

TABLE 4

| | | Example 11 | Example 12 | Example 13 | Example 14 | Example 15 | Example 16 | Example 17 | Example 18 | Example 19 | Example 20 | Example 21 | Example 22 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|---|---|---|---|---|---|---|---|---|---|---|
| Polypropylene resin (a) | a-1 | 70 | 70 | 70 | 70 | 70 | 70 | 70 | 70 | 70 | 70 | 70 | 80 | 70 | 70 | 70 | 70 | 70 | 8 | 92 |
| Hydrogenated block copolymer (b) | b-1 | 15 | | | | | | | | | | | | | | | | | | |
| | b-2 | | 15 | | | | | | | | | | | | | | | | | |
| | b-4 | | | 15 | | | | | | | | | | | | | | | | |
| | b-5 | | | | 15 | | | | | | 20 | | 10 | | | | | | | |
| | b-6 | | | | | 15 | | | | | | | | | | | | | | |
| | b-7 | | | | | | 15 | | | | | | | | | | | | | |
| | b-8 | | | | | | | 15 | | | | | | | | | | | | |
| | b-9 | | | | | | | | 15 | | | | | | | | | | | |
| | b-10 | | | | | | | | | 15 | | | | | | | | | | |
| | b-11 | | | | | | | | | | | 20 | | | | | | | | |
| | b-12 | | | | | | | | | | | | | 15 | 15 | | | | | |
| | b-13 | | | | | | | | | | | | | | | | | | 46 | 4 |
| Hydrogenated block copolymer (c) | c-1 | 15 | | | | | | | | | | | | | | | | | | |
| | c-2 | | 15 | | | | | | | | | | | | | | | | | |
| | c-3 | | | 15 | | | | | | | | | | | | | | | | |
| | c-4 | | | | 15 | | | | | | 10 | 10 | 10 | | | | | | | |
| | c-5 | | | | | 15 | 15 | | | | | | | | | | | | | |
| | c-6 | | | | | | | 15 | 15 | | | | | | | | | | | |
| | c-7 | | | | | | | | | 15 | | | | | | | | | | |
| | c-8 | | | | | | | | | | | | | 15 | | 15 | | | | |
| | c-9 | | | | | | | | | | | | | | 15 | | 15 | 15 | | |
| | c-10 | | | | | | | | | | | | | | | | | | | |
| | c-11 | | | | | | | | | | | | | | | | | | 46 | 4 |
| Mass ratio [(b)/(c)] | | 50/50 | 50/50 | 50/50 | 50/50 | 50/50 | 50/50 | 50/50 | 50/50 | 50/50 | 66.7/33.3 | 66.7/33.3 | 50/50 | 50/50 | 50/50 | 50/50 | 50/50 | 50/50 | 50/50 | 50/50 |
| Mass ratio [(a)/((b) + (c))] | | 70/30 | 70/30 | 80/20 | 70/30 | 70/30 | 70/30 | 70/30 | 70/30 | 70/30 | 70/30 | 70/30 | 80/20 | 70/30 | 70/30 | 70/30 | 70/30 | 70/30 | 8/92 | 92/8 |
| Intensity ratio (I14/I15) of wide angle X ray diffractometry | | 1.12 | 1.05 | 0.95 | 1.02 | 0.95 | 1.22 | 1.29 | 0.98 | 1.31 | 1.28 | 1.39 | 1.45 | 1.35 | 1.42 | 1.33 | 1.44 | 1.13 | Not detected | 2.8 |
| Physical property | | | | | | | | | | | | | | | | | | | | |

TABLE 4-continued

| | | Example 11 | Example 12 | Example 13 | Example 14 | Example 15 | Example 16 | Example 17 | Example 18 | Example 19 | Example 20 | Example 21 | Example 22 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|---|---|---|---|---|---|---|---|---|---|---|
| Flexibility | | ○ | ◎ | ◎ | ○ | ◎ | ○ | ○ | ○ | ○ | ○ | ○ | △ | × | × | × | × | △ | ◎ | × |
| Transparency | | ○ | ○ | ◎ | ○ | ◎ | ○ | ○ | ○ | △ | △ | ○ | △ | × | × | × | × | △ | △ | △ |
| Anisotropy | | ◎ | ◎ | ◎ | ◎ | △ | △ | ○ | ○ | ◎ | ○ | △ | ◎ | △ | △ | △ | × | × | × | ◎ |
| Low stickiness | | ◎ | ◎ | ○ | ◎ | ◎ | ◎ | ○ | ○ | ◎ | △ | △ | ◎ | ◎ | ◎ | ◎ | ◎ | × | × | ◎ |
| Impact resistance | | ◎ | ◎ | ◎ | ◎ | △ | ○ | ○ | ○ | ○ | ○ | △ | △ | △ | △ | ○ | △ | × | ○ | × |
| CFC measurement | Elution volume ratio (%) −20° C. or lower | 3.5 | 5.0 | 4.8 | 3.9 | 4.8 | 4.4 | 3.9 | 4.2 | 4.3 | 14.0 | 24.2 | 13.3 | 2.7 | 5.4 | 3.1 | 5.0 | 2.6 | 5.0 | 4.4 |
| | Higher than −20° C. and lower than 60° C. | 29.3 | 28.7 | 28.1 | 29.2 | 28.8 | 29.1 | 28.5 | 28.9 | 28.4 | 18.7 | 9.1 | 9.2 | 29.1 | 27.8 | 28.6 | 27.9 | 29.5 | 87.8 | 7.1 |
| | 60° C. or higher and lower than 150° C. | 67.2 | 66.3 | 67.1 | 66.9 | 66.4 | 66.5 | 67.6 | 66.9 | 67.3 | 67.3 | 66.7 | 77.5 | 68.2 | 66.8 | 68.3 | 67.1 | 67.9 | | 88.5 |
| | 60° C. or higher | | | | | | | | | | | | | | | | | | 7.2 | |
| Molecular weight distribution of eluted component (10° C. or higher and lower than 60° C.) | | 1.27 | 1.42 | 1.33 | 1.33 | 1.32 | 1.31 | 1.29 | 1.27 | 1.33 | 1.53 | 1.32 | 1.46 | 1.42 | 1.37 | 1.46 | 1.35 | 1.27 | 1.22 | 1.31 |

As seen from Tables 3 and 4, the sheets obtained by molding the resin compositions that satisfied the requirements of the present embodiment were free from "x" in all of the items and were evaluated as being excellent in the balance among flexibility, transparency, anisotropy, low stickiness, and low temperature impact resistance. On the other hand, Comparative Examples 1 to 4, 6, 7, 13, and 14, which did not satisfy the requirements of the present embodiment for the mass ratio (b)/(c) and/or the mass ratio (a)/((b)+(c)), resulted in "x" for at least one property of the items and were evaluated as being inferior in the balance among flexibility, transparency, anisotropy, low stickiness, and low temperature impact resistance. The composition of Comparative Example 5, which satisfied the requirements of the present embodiment for the mass ratio (b)/(c) and the mass ratio (a)/((b)+(c)) but did not contain the polymer block (C) having a relatively low amount of vinyl bond, was consequently inferior in, flexibility, transparency, and anisotropy and was evaluated as being inferior in the balance among flexibility, transparency, anisotropy, low stickiness, and low temperature impact resistance. Comparative Examples 8 to 11, which did not satisfy the requirements of the present embodiment for the structure of the hydrogenated block copolymer (b) or the hydrogenated block copolymer (c), resulted in "x" for at least one property of the items and were evaluated as being inferior in the balance among flexibility, transparency, anisotropy, low stickiness, and low temperature impact resistance.

The invention claimed is:

1. A resin composition comprising a polypropylene resin (a), a hydrogenated block copolymer (b), and a hydrogenated block copolymer (c), wherein:
    the hydrogenated block copolymer (b) is a hydrogenated block copolymer comprising, in its molecule, a polymer block (B1) having a conjugated diene compound as a main component, and a polymer block (S) having a vinyl aromatic compound as a main component;
    the hydrogenated block copolymer (c) is a hydrogenated block copolymer comprising, in its molecule, a polymer block (B2) having a conjugated diene compound as a main component, and a polymer block (S) having a vinyl aromatic compound as a main component;
    the hydrogenated block copolymer (b) and/or (c) is a hydrogenated block copolymer further comprising, in the molecule, a polymer block (C) having a conjugated diene compound as a main component;
    in the hydrogenated block copolymer (b), a content of the polymer block (C) is 20 mass % or less, a content of the polymer block (B1) is 73 to 97 mass %, and a content of the polymer block (S) is 1 to 15 mass %;
    in the hydrogenated block copolymer (c), a content of the polymer block (C) is 20 mass % or less, a content of the polymer block (B2) is 73 to 97 mass %, and a content of the polymer block (S) is 1 to 15 mass %;
    a total amount of the polymer block (C) is 1 to 20 mass %, and a total amount of the polymer blocks (C) and (S) is 3 to 27 mass %, based on 100 mass % in total of the hydrogenated block copolymers (b) and (c);
    an amount of vinyl bond before hydrogenation of the polymer block (C) is 1 mol % or more and 25 mol % or less, an amount of vinyl bond before hydrogenation of the polymer block (B1) is more than 60 mol % and 100 mol % or less, and an amount of vinyl bond before hydrogenation of the polymer block (B2) is 40 mol % or more and 60 mol % or less;
    degrees of hydrogenation of the hydrogenated block copolymers (b) and (c) are each 80 mol % or more;
    a mass ratio of a content of the hydrogenated block copolymer (b) to a content of the hydrogenated block copolymer (c), (b)/(c), is 90/10 to 10/90; and
    a mass ratio of a content of the polypropylene resin (a) to a total content of the hydrogenated block copolymer (b) and the hydrogenated block copolymer (c), (a)/((b)+(c)), is 10/90 to 90/10.

2. The resin composition according to claim 1, wherein:
    the hydrogenated block copolymer (b) and/or (c) is a hydrogenated block copolymer further comprising, at a molecular end, a polymer block (B3) having a conjugated diene compound as a main component;
    an amount of vinyl bond before hydrogenation of the polymer block (B3) is 40 mol % or more and 100 mol % or less; and
    a total amount of the polymer block (B3) based on 100 mass % in total of the hydrogenated block copolymers (b) and (c) is 1 to 10 mass %.

3. The resin composition according to claim 1, wherein the hydrogenated block copolymer (c) is a hydrogenated block copolymer comprising, in the molecule, the polymer block (C) having the conjugated diene compound as the main component.

4. The resin composition according to claim 1, wherein both the hydrogenated block copolymers (b) and (c) are hydrogenated block copolymers comprising, in each molecule, the polymer block (C) having the conjugated diene compound as the main component.

5. A resin composition comprising a polypropylene resin (a), a hydrogenated block copolymer (b), and a hydrogenated block copolymer (c), wherein:
    the hydrogenated block copolymers (b) and (c) comprise, in each molecule, a vinyl aromatic compound unit and a conjugated diene compound unit;
    a total amount of the vinyl aromatic compound unit in the hydrogenated block copolymer (b) is 1 to 15 mass %;
    a total amount of the vinyl aromatic compound unit in the hydrogenated block copolymer (c) is 1 to 15 mass %;
    degrees of hydrogenation of the hydrogenated block copolymers (b) and (c) are each 80 mol % or more;
    in the hydrogenated block copolymer (b), a butylene content and/or a propylene content is more than 60 mol % and 100 mol % or less based on 100 mol % in total of the conjugated diene compound unit;
    a tan δ peak obtained by a dynamic viscoelasticity measurement (1 Hz) of the hydrogenated block copolymer (b) is in a range of higher than −40° C. and 10° C. or lower;
    in the hydrogenated block copolymer (c), a butylene content and/or a propylene content is 40 mol % or more and 60 mol % or less based on 100 mol % in total of the conjugated diene compound unit;
    a tan δ peak obtained by the dynamic viscoelasticity measurement (1 Hz) of the hydrogenated block copolymer (c) is in a range of higher than −60° C. and −40° C. or lower;
    the hydrogenated block copolymer (b) and/or (c) has a crystallization peak at −20 to 80° C. and has a heat of crystallization of 0.1 to 10 J/g;
    the hydrogenated block copolymers (b) and (c) neither have a crystallization peak at a position other than −20 to 80° C. nor have a heat of crystallization of less than 0.1 J/g and more than 10 J/g;
    a mass ratio of a content of the hydrogenated block copolymer (b) to a content of the hydrogenated block copolymer (c), (b)/(c), is 90/10 to 10/90; and a mass ratio of a content of the polypropylene resin (a) to a total content of the hydrogenated block copolymer (b) and the hydrogenated block copolymer (c), (a)/((b)+(c)), is 10/90 to 90/10.

6. The resin composition according to claim 5, wherein the hydrogenated block copolymer (c) has the crystallization peak at −20 to 80° C. and has the heat of crystallization of 0.1 to 10 J/g.

7. The resin composition according to claim 5, wherein both the hydrogenated block copolymers (b) and (c) have the crystallization peak at −20 to 80° C. and have the heat of crystallization of 0.1 to 10 J/g.

8. The resin composition according to claim 1, wherein the mass ratio of the content of the hydrogenated block copolymer (b) to the content of the hydrogenated block copolymer (c), (b)/(c), is 75/25 to 40/60.

9. The resin composition according to claim 1, wherein the polypropylene resin (a) comprises a propylene-α-olefin random copolymer having a propylene content of 98 mass % or less.

10. The resin composition according to claim 1, wherein in wide angle X ray diffractometry, an intensity ratio of diffraction peak intensity (I(14)) at a scattering angle (2θ) of 14° to diffraction peak intensity (I(15)) at a scattering angle (2θ) of 15°, I(14)/I(15), is 0.1 or more and less than 1.4.

11. The resin composition according to claim 1, wherein in measurement by cross fractionation chromatography, an integral elution volume at −20° C. or lower is 0.1% or more and less than 20% of a total volume, an integral elution volume in a range of higher than −20° C. and lower than 60° C. is 8% or more and less than 85% of the total volume, and an integral elution volume in a range of 60° C. or higher and 150° C. or lower is 8% or more and less than 85% of the total volume.

12. The resin composition according to claim 1, wherein in measurement by cross fractionation chromatography, a molecular weight distribution (Mw/Mn) of an eluted component in a range of 10° C. or higher and lower than 60° C. is 1.50 or less.

13. A molded body comprising the resin composition according to claim 1.

14. A sheet comprising the resin composition according to claim 1.

15. A tube comprising the resin composition according to claim 1.

* * * * *